United States Patent
Takeuchi et al.

(10) Patent No.: US 6,182,508 B1
(45) Date of Patent: Feb. 6, 2001

(54) STRUCTURE OF ANGULAR RATE SENSOR

(75) Inventors: Yoshinobu Takeuchi; Satoshi Hayashi, both of Kuwana; Takehiro Watarai, Mie-ken; Shinro Oda, Kuwana; Junji Moriwaki, Kuwana; Tomoyuki Kanda, Kuwana; Katuhide Akimoto, Yokkaichi, all of (JP)

(73) Assignee: Denso Corporation, Kariya (JP)

( * ) Notice: Under 35 U.S.C. 154(b), the term of this patent shall be extended for 0 days.

(21) Appl. No.: 08/992,008

(22) Filed: Dec. 17, 1997

(30) Foreign Application Priority Data

| Dec. 18, 1996 | (JP) | 8-338656 |
| Jan. 28, 1997 | (JP) | 9-014033 |
| Jun. 5, 1997 | (JP) | 9-148135 |
| Jun. 18, 1997 | (JP) | 9-161619 |
| Jul. 29, 1997 | (JP) | 9-203165 |
| Aug. 6, 1997 | (JP) | 9-211926 |

(51) Int. Cl.[7] ............................. G01P 1/02; H01L 41/08
(52) U.S. Cl. ................... 73/493; 73/504.16; 310/326
(58) Field of Search ................... 73/504.02, 504.12, 73/504.14, 504.15, 504.16, 493; 310/348, 349, 370, 326, 316, 317, 319, 321, 329

(56) References Cited

U.S. PATENT DOCUMENTS

| 4,328,442 | * | 5/1982 | Tanaka et al. | 310/326 |
| 4,381,672 | * | 5/1983 | O'Connor et al. | 73/504.15 |
| 4,628,734 | * | 12/1986 | Watson | 73/504.16 |
| 4,652,787 | * | 3/1987 | Zingg | 310/344 |
| 5,719,460 | * | 2/1998 | Watarai et al. | 310/316 |

FOREIGN PATENT DOCUMENTS

| 61-294311 | 12/1986 | (JP) . |
| 6-013971 | 2/1994 | (JP) . |
| 6-043571 | 6/1994 | (JP) . |
| 7-243857 | 9/1995 | (JP) . |
| 7-294259 | 11/1995 | (JP) . |
| 8-170917 | 7/1996 | (JP) . |
| 8-210860 | 8/1996 | (JP) . |

* cited by examiner

*Primary Examiner*—Helen C. Kwok
(74) *Attorney, Agent, or Firm*—Pillsbury Madison & Sutro LLP

(57) ABSTRACT

An angular rate sensor is provided which measures the angular rate of a moving object such as an automotive vehicle. The angular rate sensor includes an installation base and an oscillator. The oscillator is excited to oscillate in a preselected direction perpendicular to an axis of rotation of the moving object and provides a signal indicative thereof. The installation base is used for installation of the sensor on the moving object and has an improved orientation structure for orienting the oscillator relative to the installation base during installation of the oscillator on the installation base so that the oscillator may oscillate in the preselected direction.

The angular rate sensor is disposed within a casing through improved vibration isolators for absorbing unwanted vibrations impinging upon an operation of the sensor.

25 Claims, 36 Drawing Sheets

BASE 3

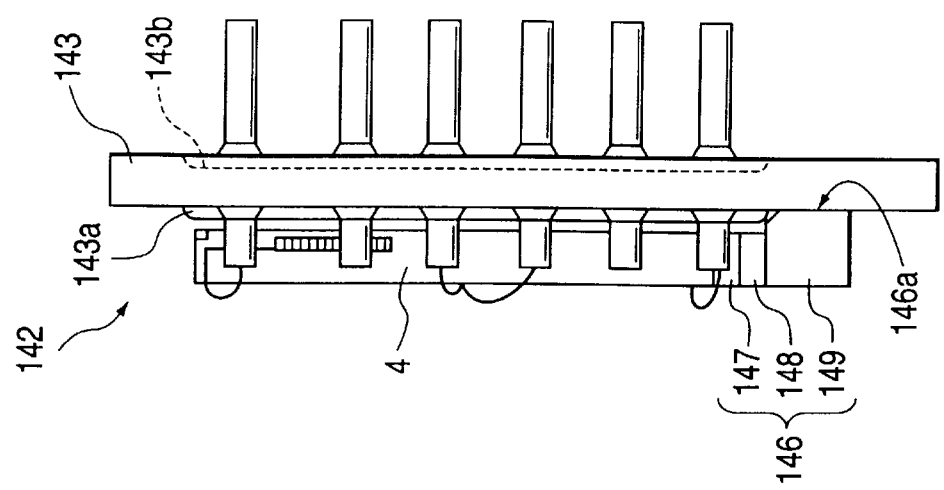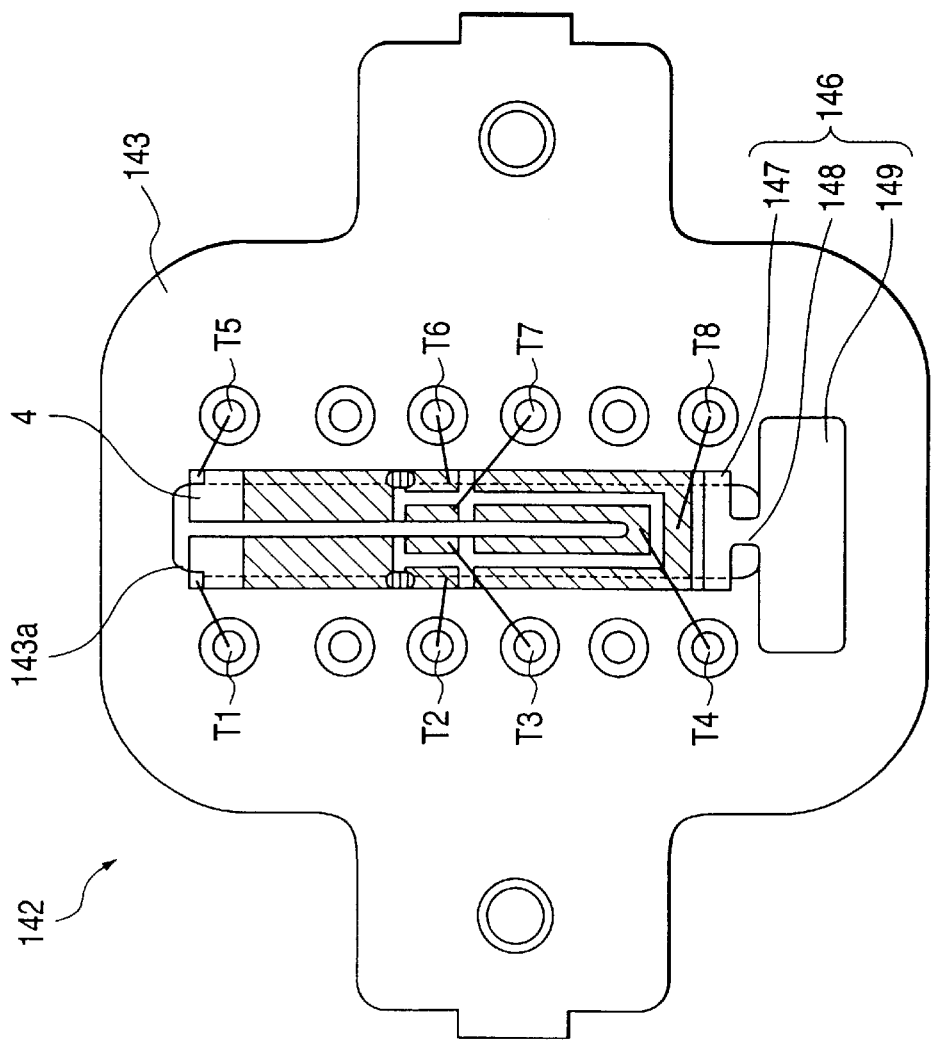

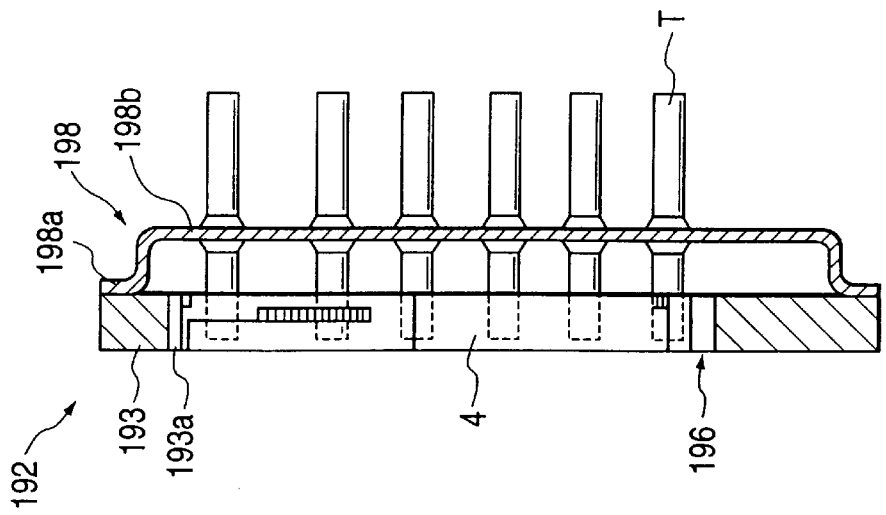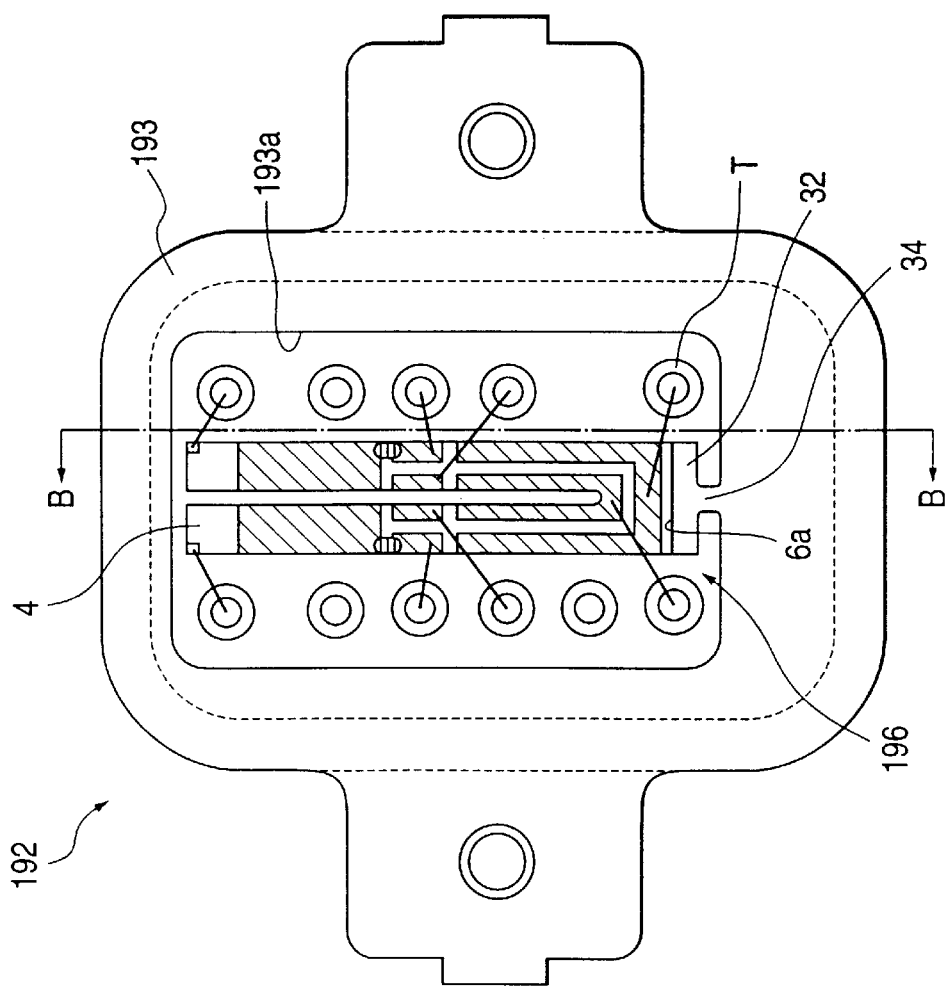

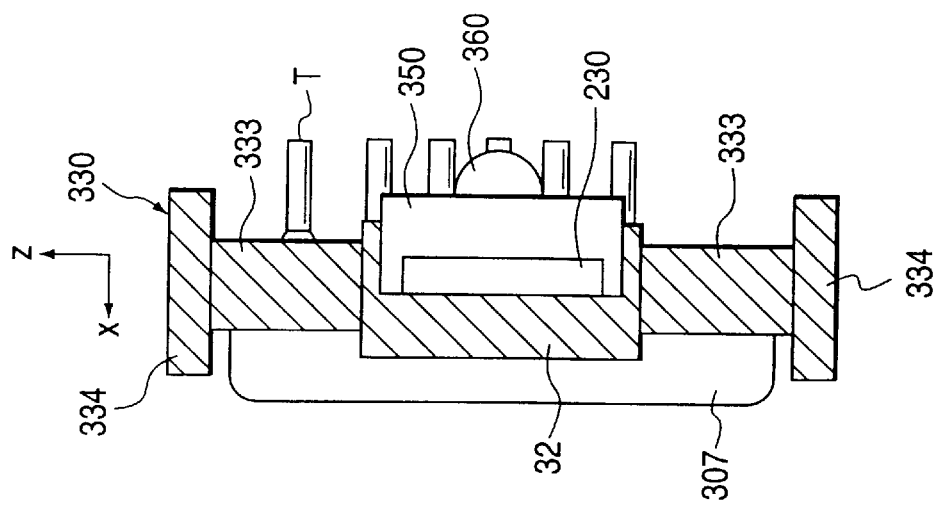
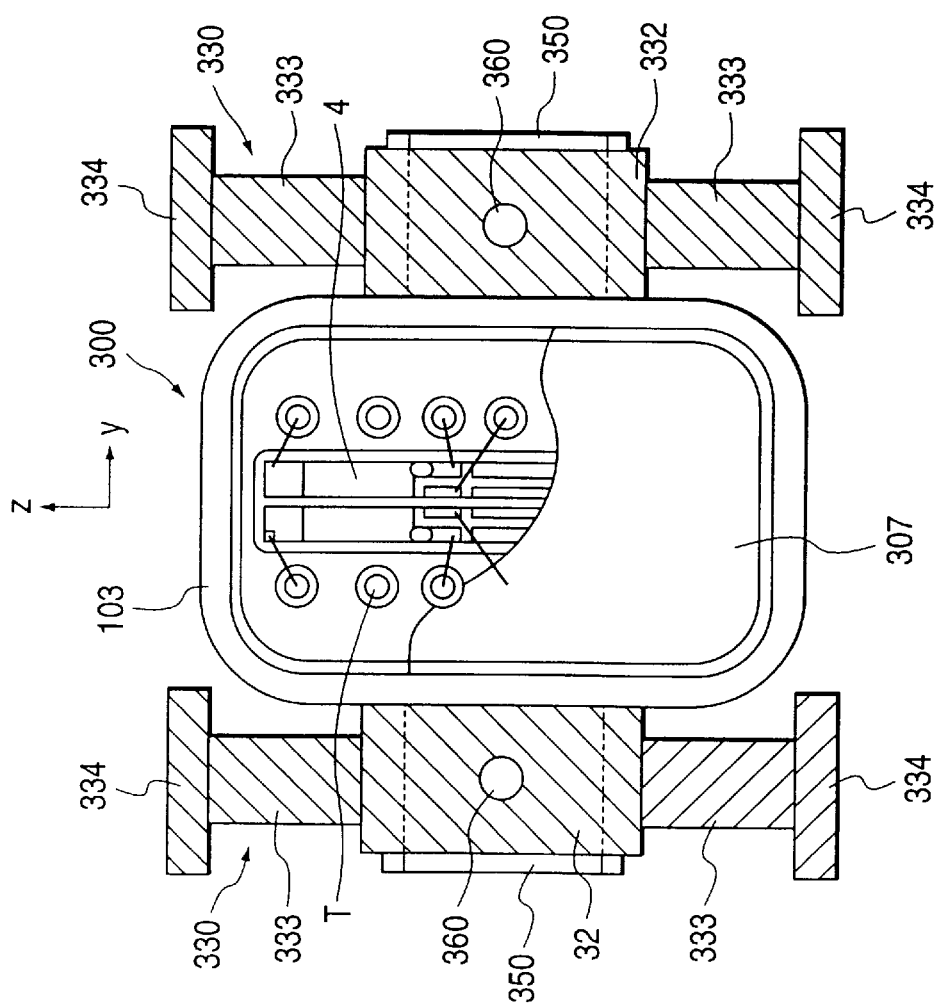
FIG. 21(a)
FIG. 21(b)

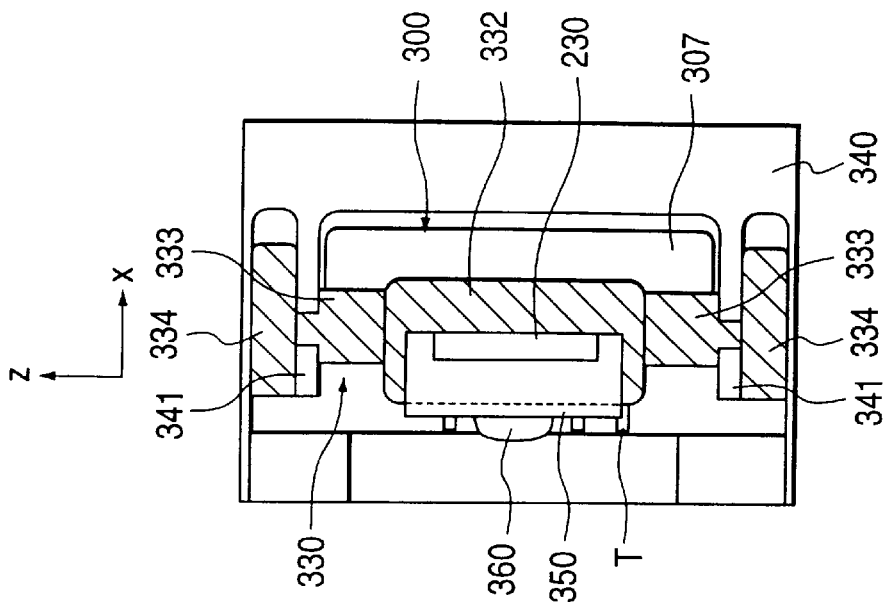
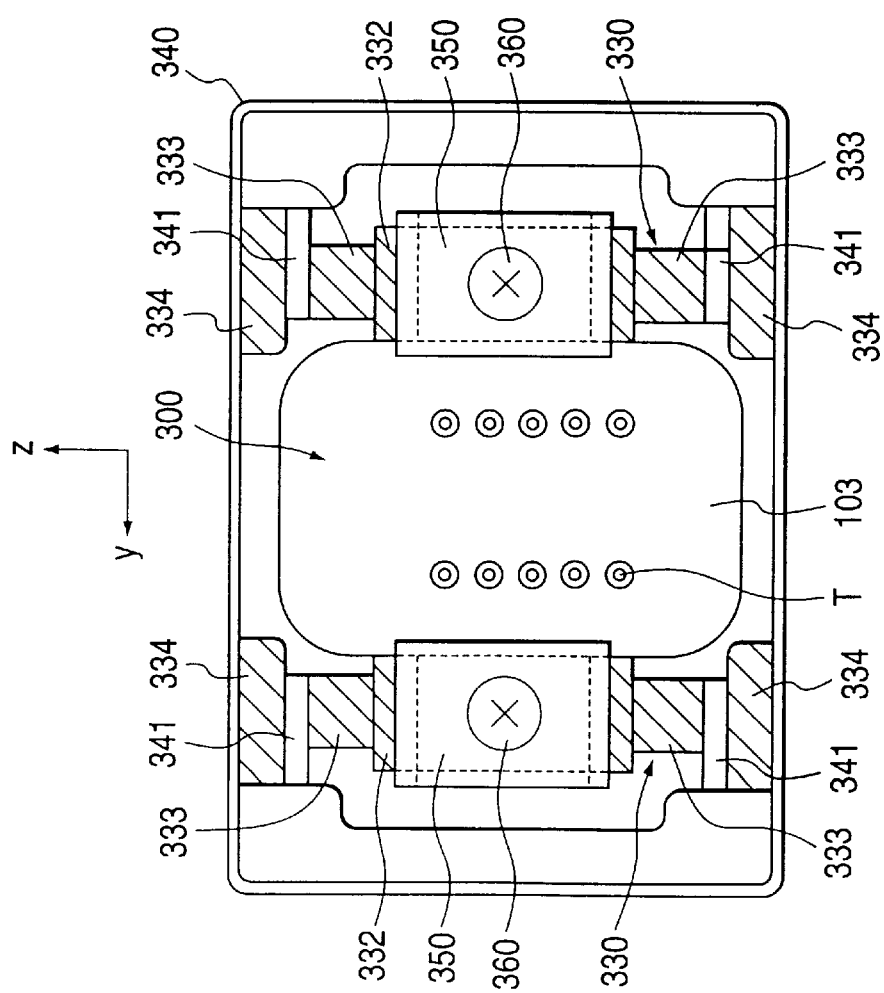

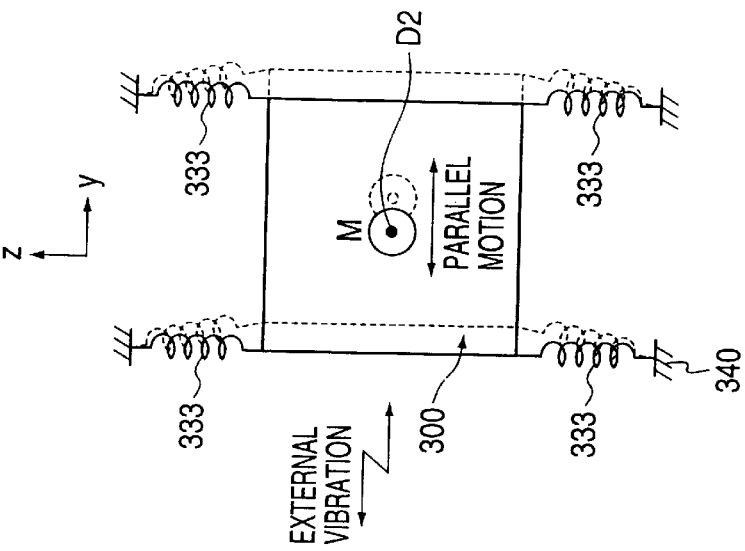
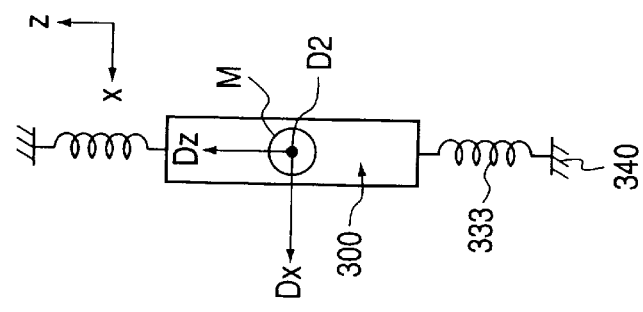
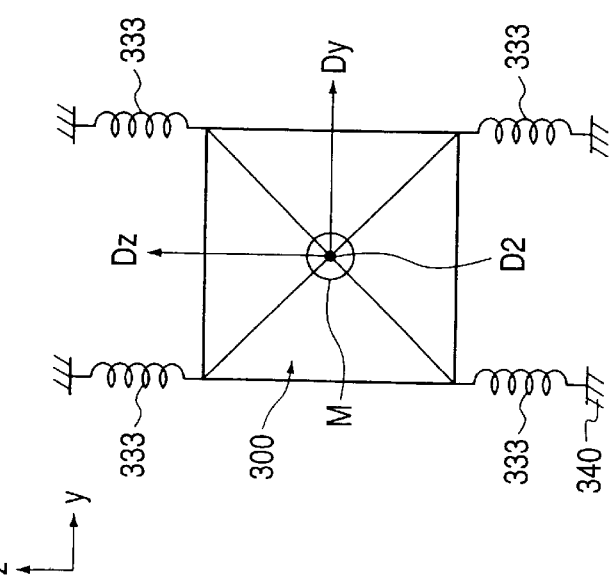
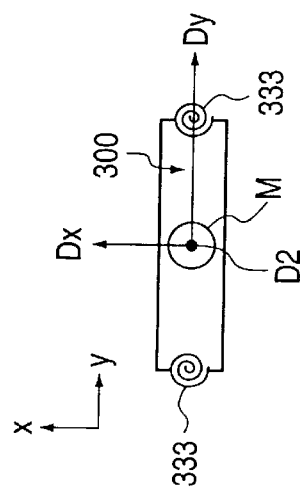

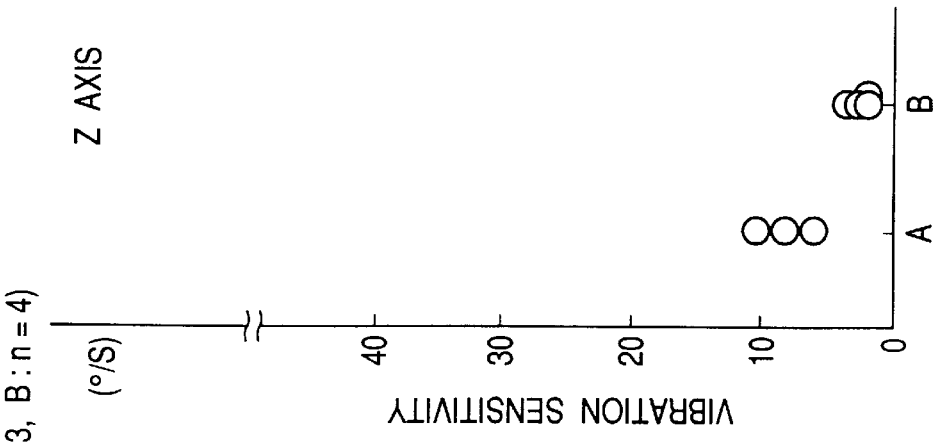
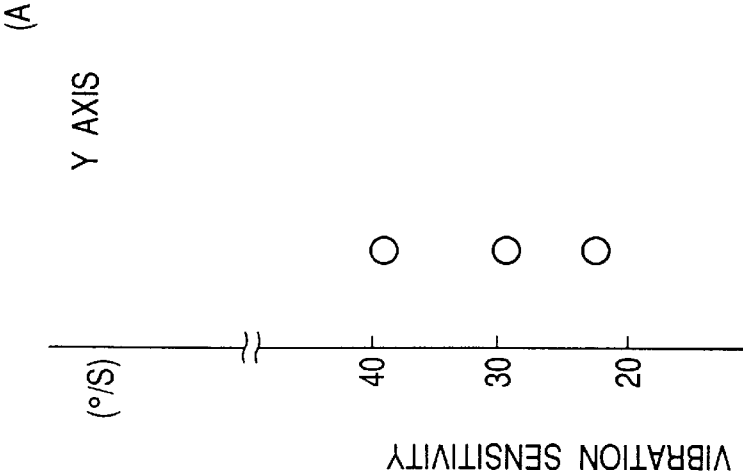
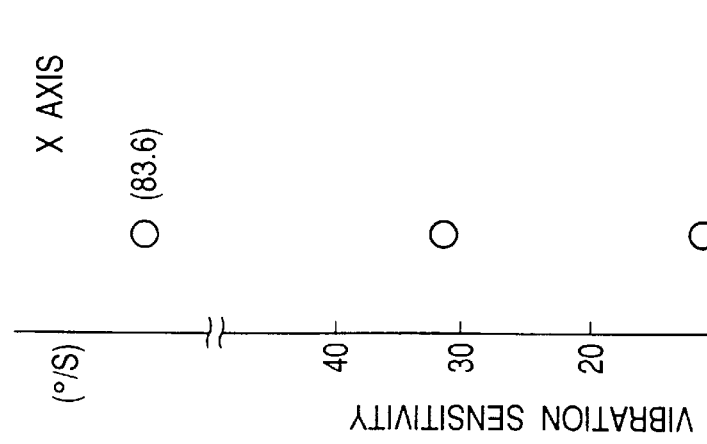

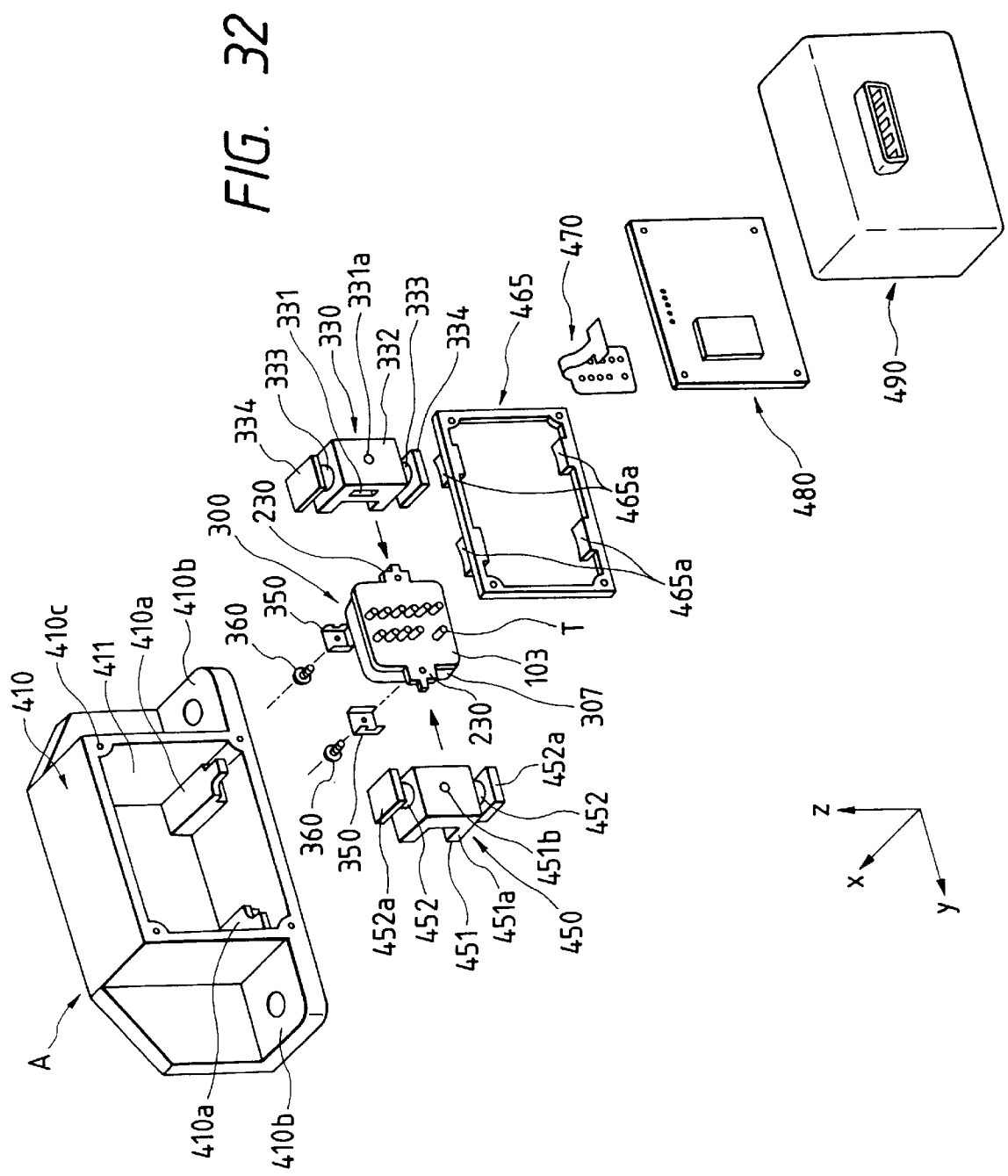

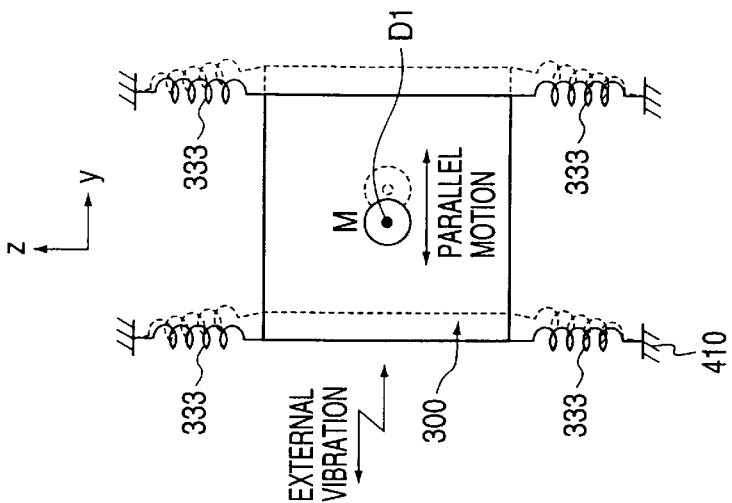
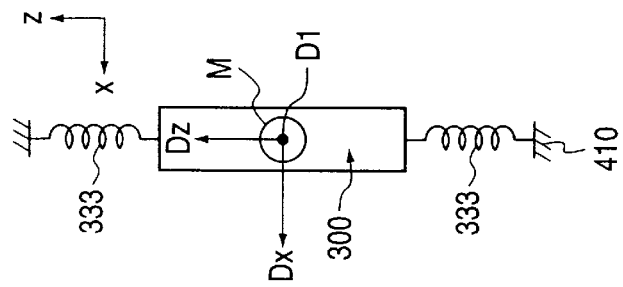
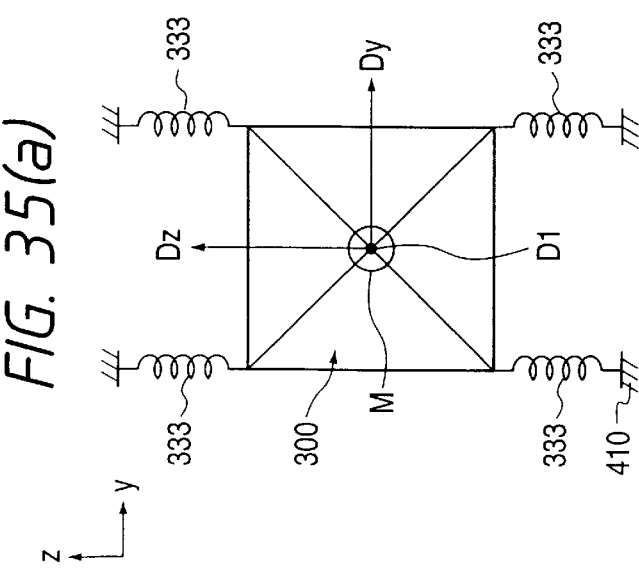

STRUCTURE OF ANGULAR RATE SENSOR

BACKGROUND OF THE INVENTION

1. Technical Field of the Invention

The present invention relates generally to an angular rate sensor which may be used in an attitude control system for automotive vehicles, and a shake compensating system for video cameras, or a gyroscope of a navigation system for moving objects.

2. Background of Related Art

Japanese Patent First Publication No. 61-294311 teaches a conventional angular rate sensor which includes a base for installation on a moving object undergoing the angular rate and an tuning fork oscillator secured on the base. The oscillator is made of a piezoelectric element and responsive to an excitation input signal to oscillate in a direction perpendicular to an axis of rotation of the moving object. The angular rate sensor monitors the direction and status of oscillation of the oscillator to determine the angular rate of the moving object.

In such an angular rate sensor, an oscillator is mounted on a base using a metallic attachment. A variety of attachments are proposed, but they do not satisfy all angular rate sensor specifications perfectly.

SUMMARY OF THE INVENTION

It is therefore a principal object of the present invention to avoid the disadvantages of the prior art.

It is another object of the present invention to provide an improved structure of an angular rate sensor capable of optimizing the performance of the sensor.

According to one aspect of the present invention, there is provided an angular rate sensor apparatus which experiences a rotation around a given axis to determine an angular rate of the rotation which comprises: (a) an oscillator made of a piezoelectric element which is excited to oscillate; (b) a base for installation of the angular rate sensor on a moving object, the base having a reference surface for installation of the oscillator; and (c) a fixing member fixing a node of the oscillator to the base, the fixing member having a base attachment portion which is welded to the reference surface of the base so as to orient the oscillation of the oscillator substantially perpendicular to the given axis of rotation.

In the preferred mode of the invention, the fixing member has formed thereon an oscillator attachment surface to which the node of the oscillator is bonded. The oscillator attachment surface is geometrically oriented to the base attachment portion so that the oscillator oscillates substantially parallel to the reference surface of the base.

The base attachment portion of the fixing member has a base attachment surface in direct engagement with the reference surface of the base. The base attachment surface of the base attachment portion is oriented at right angles to the oscillator attachment surface.

The fixing member has first and second surfaces opposed to each other in a direction of the oscillation of the oscillator. The fixing member is welded to the reference surface of the base at the first and second surfaces.

Each of the first and second surfaces has formed thereon a chamfered surface facing the reference surface of the base. The chamfered surface has an edge welded to the reference surface of the base in direct contact therewith.

A spacer is further interposed between the base attachment portion of the fixing member and the reference surface of the base. The spacer has a thickness required to keep an interval between the oscillator and the reference surface of the base at a given value.

One of the base and the fixing member has a thinner walled portion smaller in thickness than a major portion thereof. The fixing member is welded to the base at the thinner walled portion.

The fixing member may have formed therein a recess to define the inner walled portion.

The reference surface of the base may have formed therein protrusions which engage the base attachment portion of the fixture with a given gap and which establishes a preselected orientation of the reference surface of the base to the fixing member. The protrusions may have lengths extending substantially parallel to each other in the direction of the given axis of rotation of the angular rate sensor apparatus.

The base attachment portion may have formed thereon protrusions which engage the reference surface of the base with a given gap and which establishes a preselected orientation of the fixing member to the reference surface of the base. The protrusions have lengths extending substantially parallel to each other in the direction of the given axis of rotation of the angular rate sensor apparatus.

The base attachment portion may be bonded at a plurality of portions thereof to the reference surface of the base by laser welding.

The base attachment portion may alternatively be bonded at a plurality of portions thereof to the reference surface of the base by projection welding.

The base attachment portion of the fixing member may be greater in area than the oscillator attachment surface. The base attachment portion of the fixing member has a length greater than that of the oscillator attachment surface in a direction of oscillation of the oscillator.

The oscillator attachment surface of the fixing member has an area bonded to the node of the oscillator. The bonded area may occupy the oscillator attachment surface symmetrically with respect to the center thereof. It is advisable that the bonded area occupy 80% or more of the oscillator attachment surface.

According to a second aspect of the invention, there is provided an angular rate sensor apparatus which experiences a rotation around a given axis to determine an angular rate of the rotation which comprises: (a) an oscillator having a given length which oscillates, when excited, in a first direction perpendicular to a longitudinal center line thereof and which is responsive to the rotation around the given axis to vibrate in a second direction perpendicular to the first direction during the oscillation in the first direction and provides an output signal indicative of the vibration for determining the angular rate; (b) a base for installation of the angular rate sensor on a moving object, the base having a reference surface; and (c) a fixing member fixing the oscillator to the reference surface of the base so that the longitudinal center line of the oscillator lies parallel to the reference surface of the base. The base has an orientation portion used to orient the oscillator relative to the base when the fixing member fixes the oscillator to the reference surface of the base so that the longitudinal center line of the oscillator coincides substantially with the given axis of rotation.

In the preferred mode of the invention, the orientation portion includes a protrusion formed on the reference surface of the base which has a reference orientation line for orienting the oscillator relative to the base. The reference orientation line may be defined by an outer profile of the protrusion.

The orientation portion may include a recess formed in the reference surface of the base which has a reference orientation line for orienting the oscillator relative to the base. The reference orientation line is defined by a profile of the recess. The recess has an area greater than a profile of the oscillator. The oscillator is arranged on a plane flush with the reference surface of the base.

The orientation portion may alternatively include an opening formed in the reference surface of the base to secure the oscillator on an inner wall of the opening through the fixing member.

The oscillator has attached thereon excitation and excitation monitor electrodes. The oscillator is a tuning fork oscillator including a pair of arms extending parallel to the reference surface of the base.

According to a third aspect of the present invention, there is provided an angular rate sensor apparatus for determining an angular rate of a moving object which comprises: (a) a mounting member for mounting the angular rate sensor on the moving object; (b) a sensor unit including a base and an oscillator, the oscillator being mounted on the base and excited to oscillate so as to output a signal indicating an angular rate when subjected to rotation around a given axis; and (c) a vibration isolator isolating the sensor unit from vibration transmitted from the mounting member, the vibration isolator connecting the mounting member and the sensor unit so that an elastic center of the vibration isolator coincides with the center of gravity of the sensor unit.

In the preferred mode of the invention, the oscillator has a node and an oscillating portion having a length which extends parallel to the given axis of rotation. The base has a reference surface on which the node of the oscillator is attached. The reference surface is arranged parallel to the length of the oscillating portion.

The vibration isolator includes an elastic member whose elastic force acts flush with the base of the sensor unit.

The vibration isolator may alternatively include a cylindrical elastic member having a length which extends parallel to the base.

The vibration isolator may alternatively includes an elastic member having a length which extends parallel to the length of the oscillating portion of the oscillator.

The vibration isolator may alternatively include an elastic portion and a holder portion secured on the mounting member to hold the sensor unit in a given direction relative to the mounting member. The base of the sensor unit includes a protrusion supported by the holder portion of the vibration isolator. The protrusion is connected to the holder portion using a screw.

The holder portion of the vibration isolator includes a hole into which the protrusion of the base of the sensor unit is fitted.

The supporting member may be a box within which the sensor unit and the vibration isolator is disposed. The box has formed on an inner wall a bearing base having a groove into which the vibration isolator is fitted elastically.

The oscillator of the sensor unit is a tuning fork oscillator including a pair of arms extending parallel to the given axis of rotation.

The supporting member may alternatively be a casing within which the sensor unit and the vibration isolator is disposed. A damper member is further disposed between an inner wall of the casing and the sensor unit. The damper member is formed on the inner wall of the casing at a given interval away from the sensor unit.

The damper member may alternatively be formed on the vibration isolator at a given interval away from the inner wall of the casing.

The vibration isolator may include an elastic portion and a holder portion secured on the mounting member to hold the sensor unit in a given direction relative to the mounting member. The damper member is formed on the holder portion. The base of the sensor unit includes a protrusion supported by the holder portion of the vibration isolator.

The oscillator of the sensor unit is a tuning fork oscillator including a pair of arms extending parallel to the given axis of rotation.

The damper member damps an impact acting in a shearing direction of the vibration isolator.

The damper member absorbs impacts acting in first and second direction perpendicular to each other both of which are oriented perpendicular to a shearing direction of the vibration isolator. The damper member may include an L-shaped elastic member disposed at an inner corner of the casing.

The vibration isolator absorbs an impact acting in a third direction perpendicular to the first and second directions. The direction of oscillation of the oscillator when excited coincides with the first direction.

The vibration isolator may include an elastic member having a length extending in the third direction.

A signal processing circuit may further be provided which outputs an excitation signal to excite the oscillator and receives the signal outputted from the oscillator to determine the angular rate. The signal processing circuit is connected to the vibration isolator.

A rectangular mount frame may further be provided which includes first and second opposed walls and third and fourth opposed walls, attached to an inner wall of the casing. The vibration isolator may be supported by the first and second opposed walls so as to absorb an impact acting in a first direction parallel to the third and fourth opposed walls, the damper member being mounted on at least one of the third and fourth opposed walls to absorb an impact acting in a second direction perpendicular to the first direction.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 14(a) is a plan view which shows an angular rate sensor according to the ninth embodiment of the invention;

FIG. 14(b) is a side view of FIG. 14(a);

FIG. 19(a) is a plan view which shows an angular rate sensor according to the twelfth embodiment of the invention;

FIG. 19(b) is a side view of FIG. 19(a);

FIG. 21(a) is a plan view which shows a vibration proofing structure of an angular rate sensor according to the thirteenth embodiment of the invention;

FIG. 21(b) is a side view of FIG. 20(a);

FIG. 22(a) is a plan view which shows the vibration proofing structure shown in FIGS. 20(a) and 20(b) mounted within a casing;

FIG. 22(b) is a side view of FIG. 21(a);

FIGS. 26(a) to 26(c) and FIG. 27 show a physical mode of the vibration proofing structure shown in FIGS. 21(a) and 21(b);

FIGS. 29(a) to 29(c) are graphs showing vibration sensitivities of the vibration proofing structure of the thirteenth embodiment shown in FIG. 20 in x-, y-, and z-axis directions;

FIG. 32 is an exploded perspective view which shows a vibration proofing structure according to the fourteenth embodiment of the invention;

FIGS. 35(a) to 35(c) and FIG. 36 show a physical mode of the vibration proofing structure shown in FIGS. 33(a) and 33(b);

DESCRIPTION OF THE PREFERRED EMBODIMENT

Figure 1:
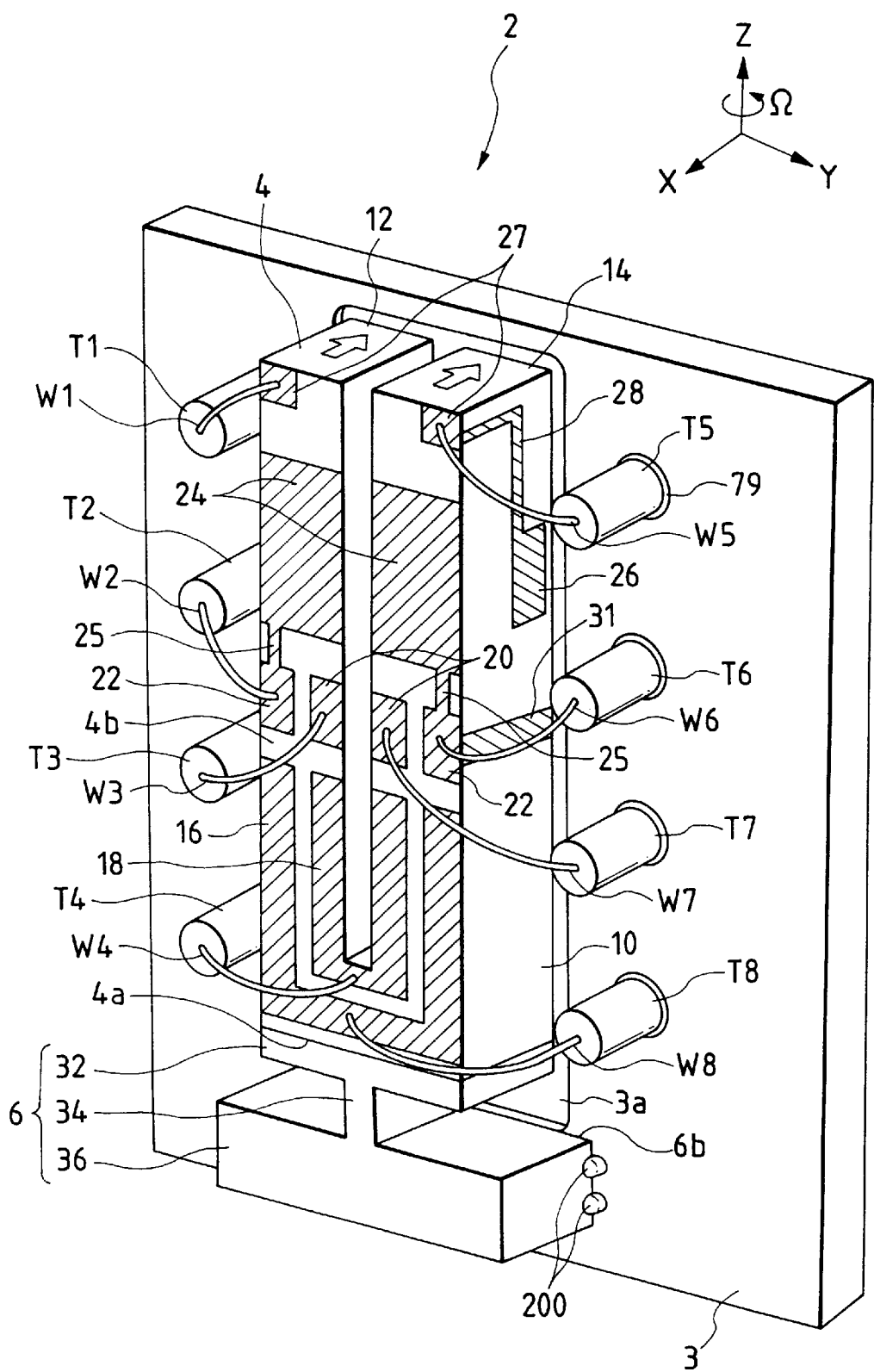
FIG. 1 is a perspective view which shows an angular rate sensor according to the first embodiment of the invention.

Referring now to the drawings, wherein like reference numbers refer to like parts throughout several views, particularly to FIG. 1, there is shown the angular rate sensor 2 according to the first embodiment of the present invention.

The angular rate sensor 2 of the invention is, for example, a yaw rate sensor for measuring the yaw rate of a moving object such as an automotive vehicle or a handy video camera and generally includes the base 3, the oscillator 4, and the fixture 6. The base 3 is made of a steel plate and installed at a back surface thereof on a portion of, for example, a body of an automotive vehicle near a vertical axis of rotation. The oscillator 4 is made of a piezoelectric element having disposed on a surface thereof some electrodes. The fixture 6 is made from a 42-alloy and mounted on the base 3 for supporting the oscillator 4 parallel to an outer surface (i.e., a reference surface) of the base 3 with a given gap.

The oscillator 4 is, as clearly shown in FIG. 1, a typical tuning fork oscillator and includes the base 10 (i.e., a node) and a pair of arms 12 and 14. The base 10 is attached at the bottom 4a to the fixture 6. The arms 12 and 14 extend upward, as viewed in the drawing, in parallel to each other.

The oscillator 4 has disposed on the front surface 4b a pair of input electrodes 16 and 18, a pair of monitor electrodes 20, a pair of virtual GND electrodes 22, a pair of polarization treatment electrodes 24, and a pair of short-circuit electrodes 25. The input electrodes 16 and 18 receive excitation signals to oscillate the arms 12 and 14 so that they are moved close to and away from each other (i.e., in the y axis direction as illustrated in FIG. 1). The monitor electrodes 20 provide signals indicative of the oscillation of the oscillator 4. The GND electrodes 22 are grounded or connected to a reference potential. The polarization treatment electrodes 24 are used for polarization treatment of the oscillator 4. The short-circuit electrodes short-circuit the GND electrodes 22 and the polarization treatment electrodes 24, respectively.

The oscillator 4 has also disposed on side surfaces thereof a pair of signal output electrodes 26 which output sensor signals proportional to an angular rate $\Omega$ of rotation of the angular rate sensor 2. The signal output electrodes 26 are connected through the lead electrodes 28 to the pad electrodes 27 formed on upper portions of the front surface 4b.

On the whole of a back surface of the oscillator 4, a common electrode is disposed which is used for the polarization treatment of the oscillator 4 and which is kept at the grounded potential during measurement of the angular rate $\Omega$. The common electrode is connected to the GND electrodes 22 through a pair of short-circuit electrodes 31 attached to side surfaces of the oscillator 4.

Figure 2A:
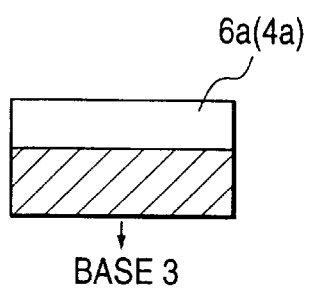
FIGS. 2(a) to 2(d) each show an area of an attachment surface of a fixture bonded to an oscillator.
Figure 2B:
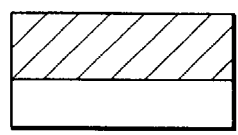
Figure 2C:
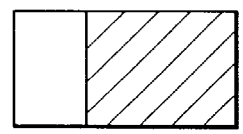
Figure 2D:
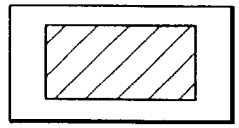
Figure 2E:
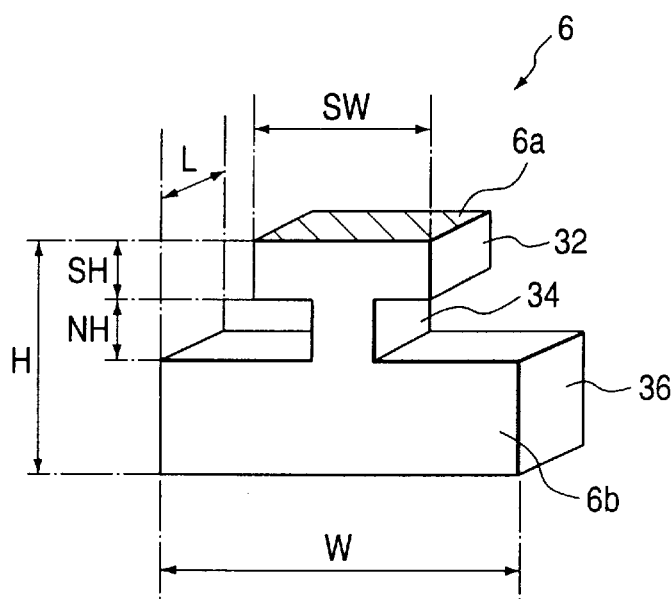
FIG. 2(e) is a perspective view which shows dimensions of a fixing member.

The fixture 6 is of substantially H-shape and includes the mount portion 32, the connecting portion 34, and the base portion 36. The mount portion 32 has the attachment surface 6a, as shown in FIG. 2(e), which is identical in size with the bottom 4a. The connecting portion 34 is smaller in width than the mount portion 32 and connects between the centers of the mount portion 32 and the base portion 36. The base portion 36 is attached at the attachment surface 6b to the base 10. The attachment surfaces 6a and 6b are, as will be apparent from the discussion below, machined to be oriented at right angles to each other in order to install the oscillator 4 to the base 3 so that the longitudinal center line of the oscillator 4 extends parallel to the upper surface (i.e., the reference surface) of the base 3. This allows the angular rate sensor 2 to be mounted on a moving object so that an axis of rotation (i.e., the z axis in FIG. 1) of a moving object, whose angular rate is to be measured by the angular rate sensor 2, may lie in coincidence with the longitudinal center line of the oscillator 4 passing between opposed side surfaces of the arms 12 and 14.

The base 3 has formed in the upper surface the rectangular recess 3a and disposed on the sides of the recess 3a terminals T1 to T8 connecting with the pad electrodes 27, the GND electrodes 22, the monitor electrodes 20, and the input electrodes 16 and 18 through wires W1 to W8. The glass material 79 is loaded into a clearance between the periphery of each of the terminals T1 to T8 and a mount hole formed in the base 3 for electrical isolation and hermetic sealing. The recess 3a is, as clearly shown in FIG. 1, slightly greater in an area than the oscillator 4 and the mount portion 36 of the fixture 6 and has the width and depth, as will be described later in detail, enough to prevent the oscillator 4 from touching or colliding with the base 3 due to excitation of the oscillator 4 and movement of the angular rate sensor 2 at the angular rate $\Omega$. The recess 3a is, as will be apparent from the following discussion, used to orient the oscillator 4 relative to the base 3, that is, to bring the length of the oscillator 4 into coincidence with the axis of rotation (i.e., the z axis) of the moving object.

The bottom 4a of the oscillator 4 is bonded to the attachment surface 6a of the fixture 6 so that the back surface of the oscillator 4 may be flush with the attachment surface 6b of the fixture 6. The fixture 6 is connected at the attachment surface 6b directly to the upper surface of the base 3 by bonding edges of both side surfaces of the base portion 36 at two points, as indicated at numeral 200, on each side surface using laser welding. The edges of upper and lower surfaces of the base portion 36 may also be welded to the upper surface of the base 3.

The oscillator 4 is subjected to polarization treatment to orient the polarization thereof to a direction, as indicated by white arrows in FIG. 1, prior to installation on the base 3 through the fixture 6 by setting the input electrodes 16 and 18, the monitor electrodes 20, and the polarization electrodes 24 to the same potential and applying a given voltage across the electrodes 16, 18, 20, and 24 and the common electrode.

In operation, 180° out-of-phase ac excitation signals having a given frequency are applied to the input electrodes 16 and 18. This will cause the oscillator 4 to be excited to oscillate the arms 12 and 14 in the y-axis direction so that they are moved in a cycle close to and away from each other. During this oscillation, the monitor electrodes 20 output monitor signals indicative of oscillation of the oscillator 4 which are, in turn, fedback to, for example, an excitation signal generator and used for establishing the stability of excitation of the oscillator 4.

When the angular rate sensor 2 is moved at the angular rate $\Omega$ around the z axis (i.e., the longitudinal center line of the oscillator 4 extending between the arms 12 and 14) during the oscillation of the oscillator 4, it will cause the Coriolis force to be produced which deflects the arms 12 and 14 in opposite directions along the z axis extending perpendicular both to the x and y axes. This deflection results in compression and tension stresses in the arms 12 and 14, thereby developing the voltage across the signal output electrodes 26 proportional to the angular rate $\Omega$ which is, in turn, extracted as an angular rate signal.

The angular rate sensor 2 of this embodiment features the structure wherein the fixture 6 is bonded directly to the base 3 and supports the oscillator 4 parallel to the upper surface (i.e., the reference surface) of the base 3 with a given gap. This minimizes undesired oscillations of the oscillator 4, thereby resulting in high-accuracy angular rate detection.

The fixture 6 is, as described above, bonded to the base 3 using laser welding which produces less heat, thus avoiding the deterioration of polarization of the piezoelectric element of the oscillator 4. This results in improved reliability of the angular rate sensor 2.

Figure 3:
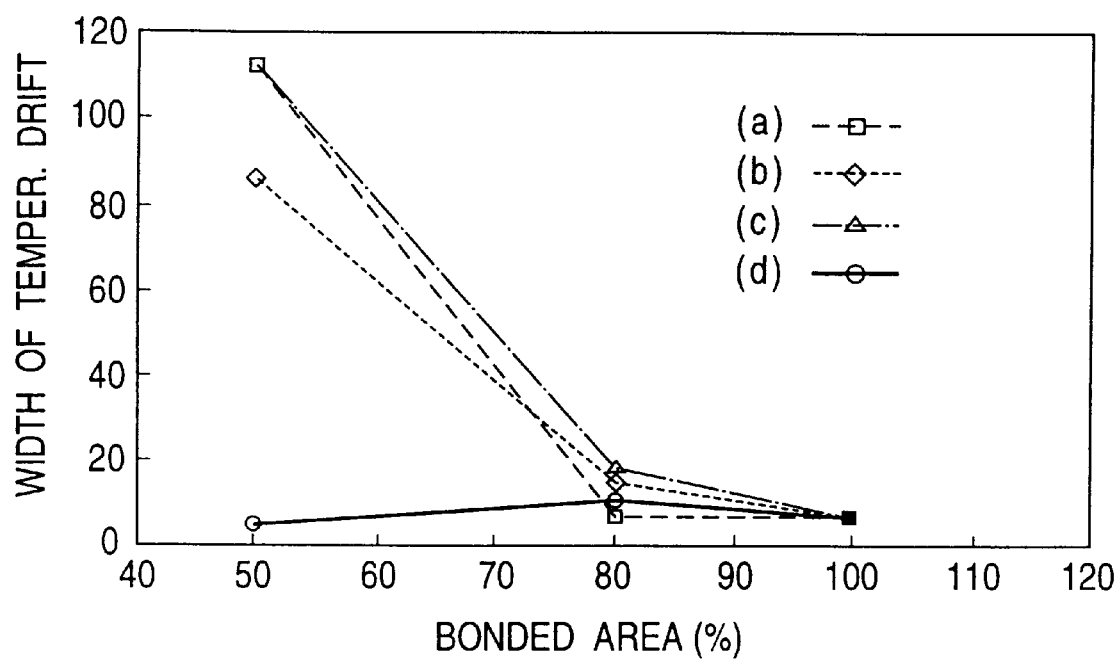
FIG. 3 is a graph which shows a temperature drift of a sensor output and the bonded areas of the attachment surface of the fixture as shown in FIGS. 2(a) to 2(e)

Usually, the undesired oscillations produced at the oscillator 4 depend not only upon the attachment of the fixture 6 to the base 3, but also upon a bond between the oscillator 4 and the fixture 6. FIG. 3 shows test results indicating variations in width of a temperature drift in output (i.e., offset voltage) of the angular rate signal caused by the undesired oscillations of the oscillator 4 in terms of a bond between the bottom 4a of the oscillator 4 and the attachment surface 6a of the fixture 6. Note that the width of a temperature drift means the width of a variation in output of the angular rate sensor 2 when the ambient temperature is changed from –30 to 85° C. and is expressed in FIG. 3 as being divided by an output produced per unit angular rate; namely, an angle per unit time (°/s).

The fixture 6 used in the tests has, as shown in FIG. 2(e), a height H of 5.3 mm and a thickness L of 2.1 mm. The base portion 36 has a width W of 9.0 mm. The mount portion 32 has a width SW of 4.4 mm and a height SH of 1.0 mm. The connecting portion 34 has a height NH of 1.0 mm. The oscillator 4 has a height (i.e., length) of 20.0 mm, a width of 4.4 mm, and a thickness of 2.1 mm. Each of the arms 12 and 14 has a height of 17.0 mm, a width of 2.0 mm, and a thickness of 2.1 mm.

FIGS. 2(a) to 2(d) are front views showing the bottom 4a of the oscillator 4 or the attachment surface 6a of the fixture 6. Each hatched portion illustrates an adhesive-applied area. FIGS. 2(a) to 2(d) correspond to lines (a) to (d) shown in FIG. 3, respectively. Specifically, the line (a) indicates the width of a temperature drift when the adhesive is applied to a lower portion of the attachment surface 6a (or the bottom 4b) close to the base 3. The line (b) indicates the width of a temperature drift when the adhesive is applied to an upper portion of the attachment surface 6a (or the bottom 4b) far from the base 3. The line (c) indicates the width of a temperature drift when the adhesive is applied to a lateral portion of the attachment surface 6a (or the bottom 4b). The line (d) indicates the width of a temperature drift when the adhesive is applied to a central portion of the attachment surface 6a (or the bottom 4b).

The graph of FIG. 3 shows that the bonding of the oscillator 4 and the fixture 6 with the adhesive applied to the central portion of the attachment surface 6a (or the bottom 4b) minimizes, as indicated by the line (d), the temperature drift regardless of an adhesive-applied area and that the temperature drift is greatly decreased as long as the adhesive-applied portion of the attachment surface 6a (or the bottom 4b) occupies an area more than or equal to 80% thereof even when the adhesive-applied portion of the attachment surface 6a (or the bottom 4b) is biased from a vertical center line (extending perpendicular the longitudinal center line of the oscillator 4) in any direction. Specifically, it is advisable that the adhesive be applied to an overall surface of the attachment surface 6a or the bottom 4b, but the above described adhesive applications can also decrease the undesired oscillations of the oscillator 4.

Figure 4A:
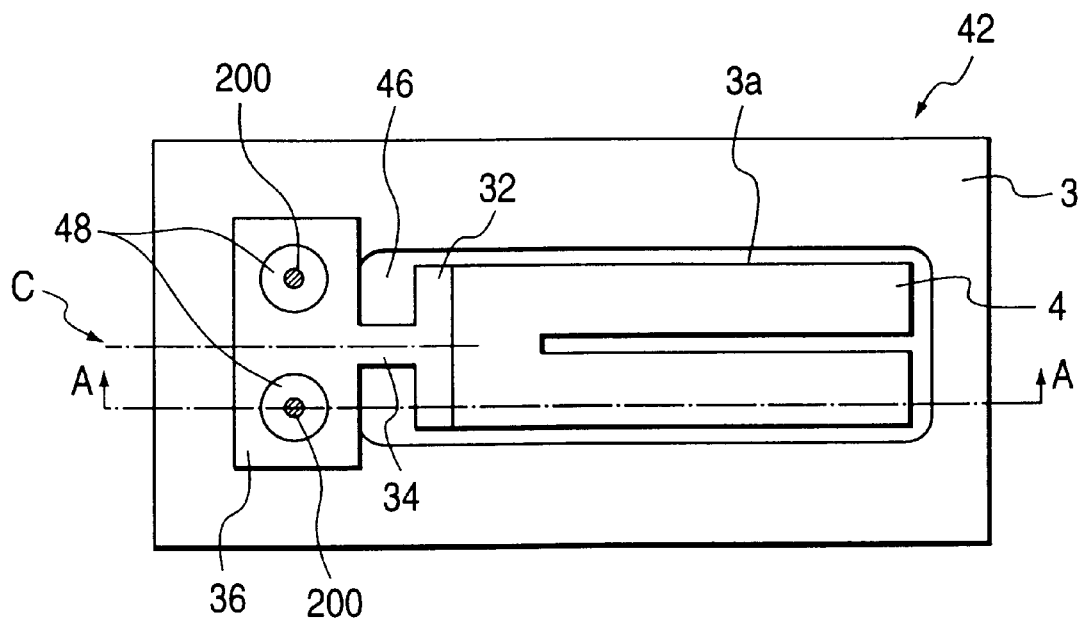
FIG. 4(a) is a plan view which shows the second embodiment of an angular rate sensor of the invention.
Figure 4B:
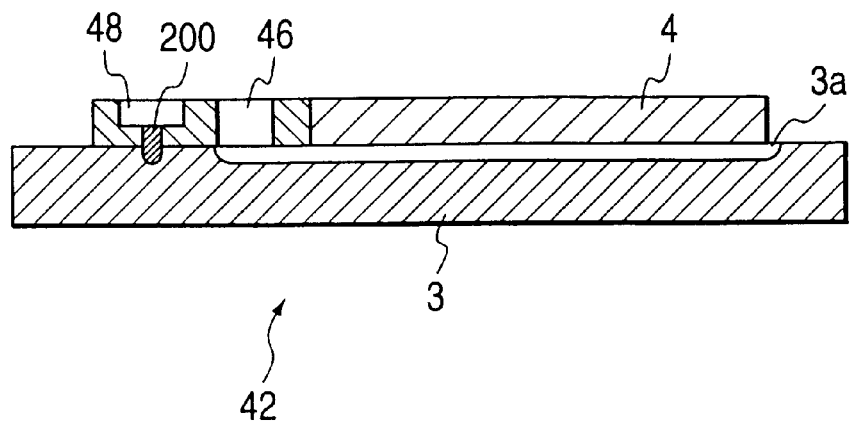
FIG. 4(b) is a longitudinal cross sectional view taken along the line A—A in FIG. 4(a)

FIGS. 4(a) and 4(b) show the angular rate sensor 42 according to the second embodiment of the invention which is different from the first embodiment only in structure of the fixture 46 and location of laser-welded portions 200 of the fixture 46 and the base 3. Other arrangements are identical, and illustration and explanation thereof in detail will be omitted here.

The fixture 46 is identical in structure with the fixture 6 of the first embodiment except for formation of a pair of circular recess 48 in the base portion 36 thereof. The recesses 48 are formed across the center line C extending in alignment with the length of the connecting portion 34. The fixture 46 is connected to the base 3 by laser welding at central portions 200 of thin-walled bottoms of the recesses 48. The metallic oxide flown by irradiation of a laser beam during welding is thus adhered only to an inner wall of each of the recesses 48 without flying out of the recesses 48 to stain the outer surface of the base 3. This facilitates ease of installation of, for example, an oscillator protection cover on the base 3 using projection welding.

Figure 5A:
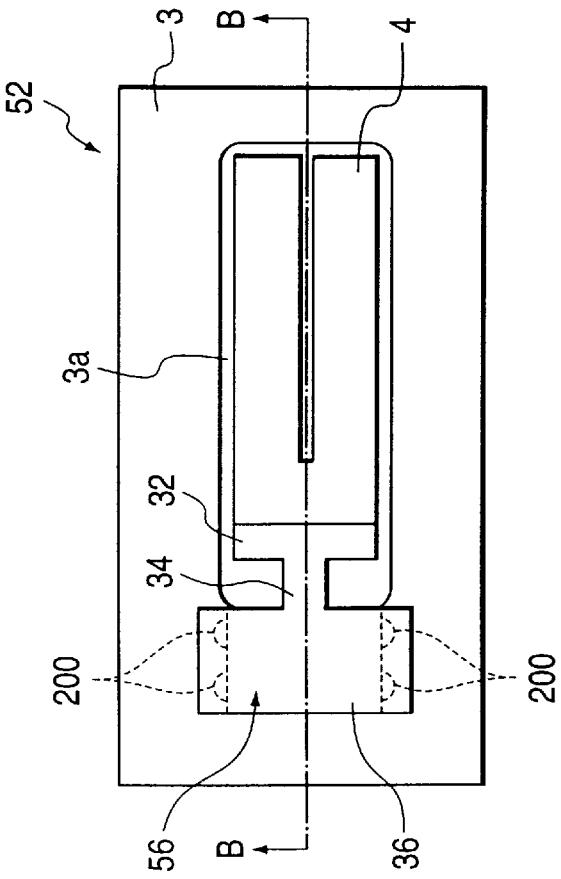
FIG. 5(a) is a plan view which shows the third embodiment of an angular rate sensor of the invention.
Figure 5C:
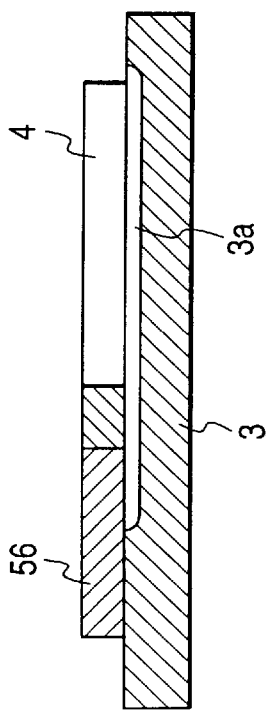
FIG. 5(c) is a longitudinal cross sectional view taken along the line B—B in FIG. 5(a)
Figure 5B:
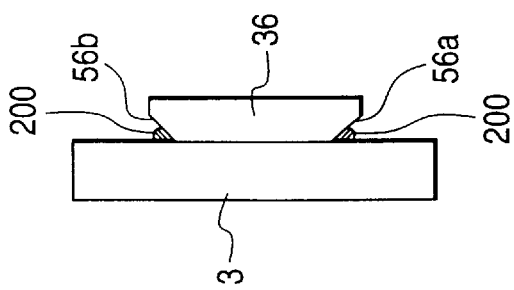
FIG. 5(b) is an end view of FIG. 5(a)

FIGS. 5(a) to 5(c) show the angular rate sensor 52 according to the third embodiment of the invention which is different from the first embodiment only in structure of the fixture 56. Other arrangements are identical, and illustration and explanation thereof in detail will be omitted here.

The fixture 56, similar to the first embodiment, consists of the mount portion 32, the connecting portion 34, and the base portion 36. The base portion 36 has, as clearly shown in FIG. 5(b), chamfered or tapered side surfaces 56a and 56b which are connected at lower edges thereof to the base 3 through laser welding. Therefore, the metallic oxide produced by irradiation of a laser beam during welding is adhered only to the tapered side surfaces 56a and 56b without flying therearound.

Figure 6A:
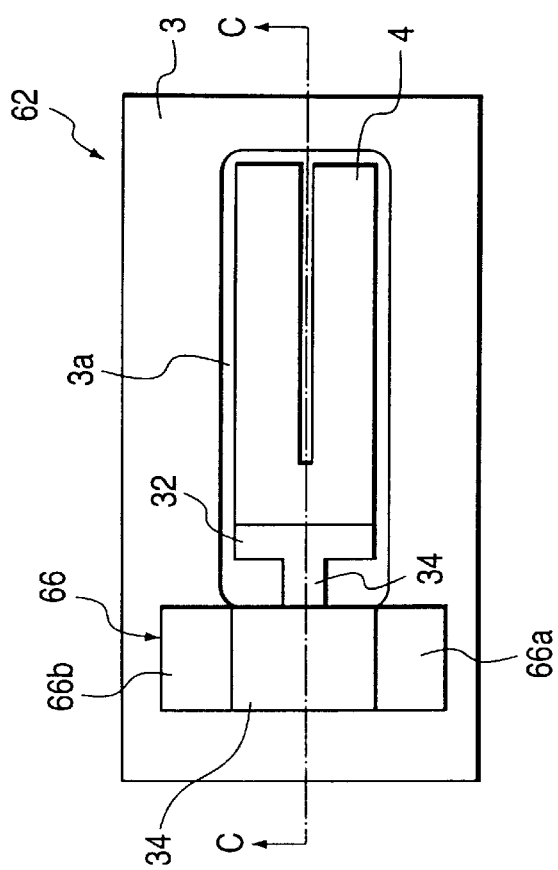
FIG. 6(a) is a plan view which shows the fourth embodiment of an angular rate sensor of the invention.
Figure 6B:
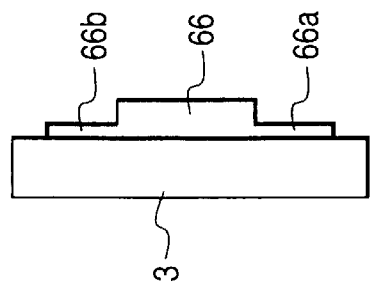
FIG. 6(b) is an end view of FIG. 6(a)
Figure 6C:
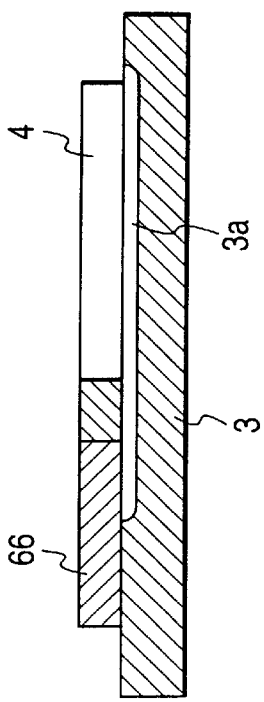
FIG. 6(c) is a longitudinal cross sectional view taken along the line C—C in FIG. 6(a)

FIGS. 6(a) to 6(c) show the angular rate sensor 62 according to the fourth embodiment of the invention which is different from the first embodiment only in structure of the fixture 66. Other arrangements are identical, and illustration and explanation thereof in detail will be omitted here.

The fixture 66, similar to the first embodiment, consists of the mount portion 32, the connecting portion 34, and the base portion 36. The base portion 36 has, as clearly shown in FIG. 6(c), thin-walled side portions 66a and 66b which are thinner than that of a central portion and is connected to the base 3 at bottoms of the side portions 66a and 66b using projection welding or in the same welding as that in the first embodiment. Specifically, the thin-walled side portions 66a and 66b which have smaller volume per unit area are welded, so that the quantity of heat transmitted to the fixture 66 during welding becomes small, thereby allowing the welding to be performed with less power. The quantity of heat transmitted to the oscillator 4 through the fixture 66 is thus small, thereby resulting in decreased thermal damage caused to the oscillator 4 during the welding.

Figure 7A:
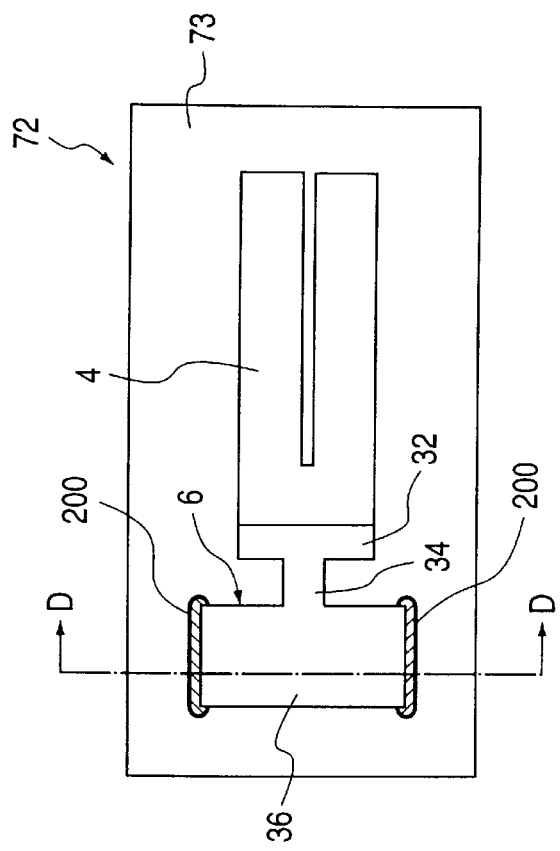
FIG. 7(a) is a plan view which shows the fifth embodiment of an angular rate sensor of the invention.
Figure 7B:
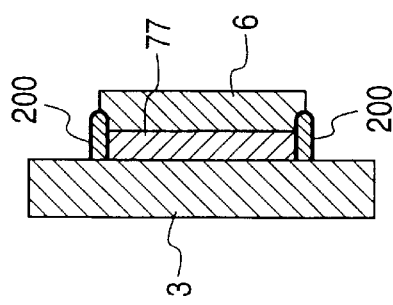
FIG. 7(b) is a traverse cross sectional view taken along the line D—D in FIG. 7(a)
Figure 7C:
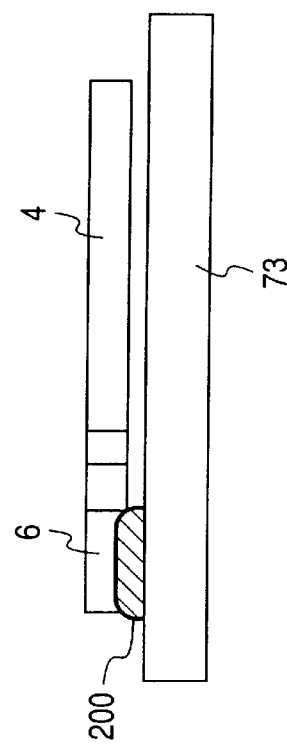
FIG. 7(c) is a side view of FIG. 7(a)

FIGS. 7(a) to 7(c) show the angular rate sensor 72 according to the fifth embodiment of the invention which is different from the first embodiment only in structure of the base 73 and location of laser-welded portions 200 of the fixture 6 and the base 73. Other arrangements are identical, and illustration and explanation thereof in detail will be omitted here.

The base 73, as can be seen from FIG. 7(c), has a flat outer surface without the recess 3a formed in the base 3 of the first embodiment. The spacer 77 which is made of a metallic plate having a relatively small coefficient of thermal expansion is interposed between the base portion 36 of the fixture 6 and the base 73. The fixture 6 is connected to the base 73 by laser-welding sides of the fixture 6 and the spacer 77 as indicated at numeral 200.

The spacer 77 has the thickness required for keeping the oscillator 4 parallel to the upper surface of the base 73 with a given gap. Specifically, it is easy to hold the oscillator 4 parallel to the base during welding of the fixture 6 to the base 73 only by pressing the fixture 6 against the base 73 through the spacer 77.

Figure 8A:
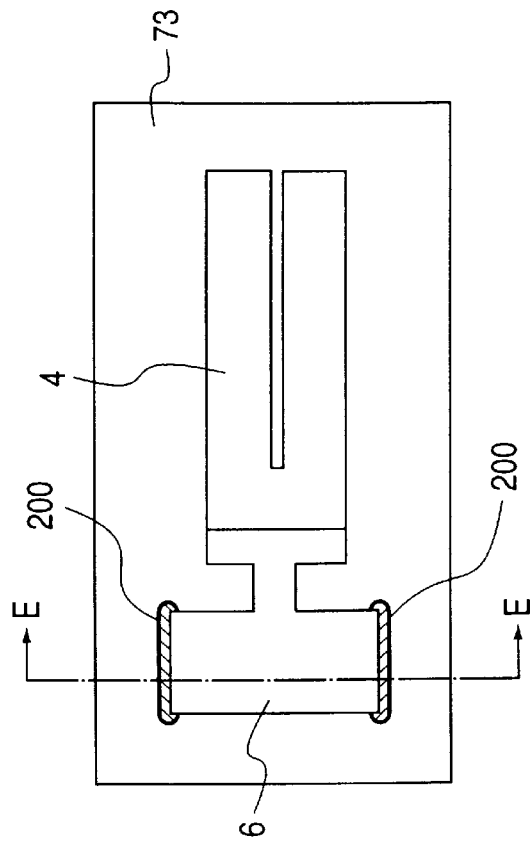
FIG. 8(a) is a plan view which shows a modification of the fifth embodiment in FIGS. 7(a) to 7(c)
Figure 8B:
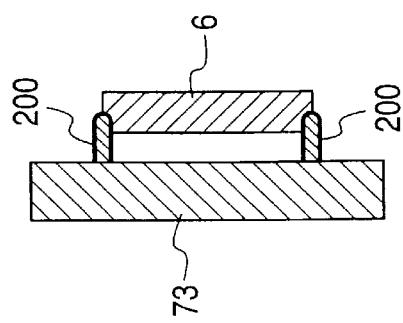
FIG. 8(b) is a traverse cross sectional view taken along the line E—E in FIG. 8(a)
Figure 8C:
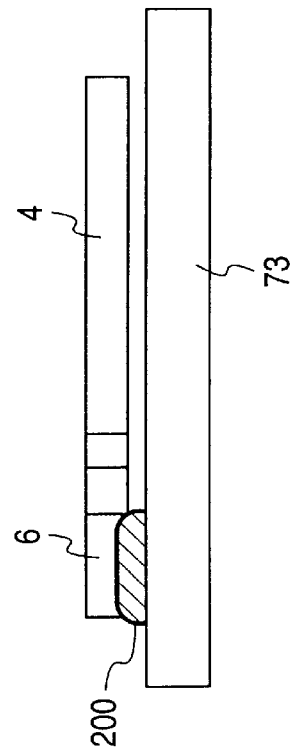
FIG. 8(c) is a side view of FIG. 8(a)

FIGS. 8(a) to 8(c) show a modification of the fifth embodiment which is different therefrom in that the fixture 6 is attached to the base 73 with a given gap, for example, several millimeters.

The attachment of the fixture 6 to the base 73 is accomplished by placing a spacer, which is slightly smaller in area than the fixture 6, between the fixture 6 and the base 73, laser-welding the sides of the fixture 6 to the base 73, and removing the spacer.

Figure 9A:
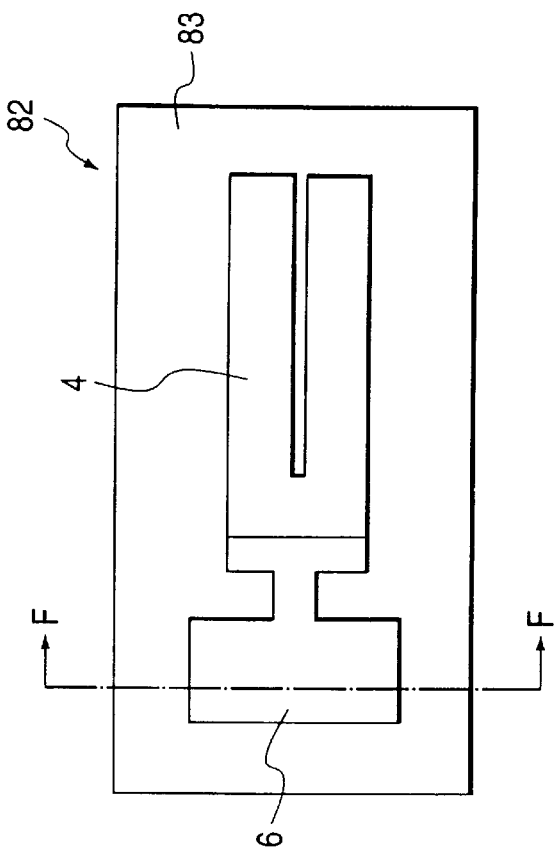
FIG. 9(a) is a plan view which shows an angular rate sensor 82 according to the sixth embodiment of the invention.
Figure 9C:
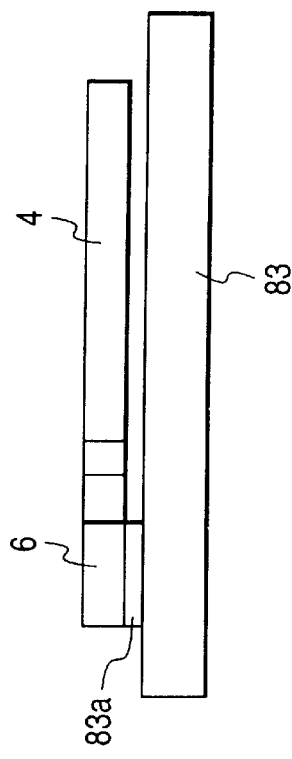
FIG. 9(c) is a side view of FIG. 9(a)
Figure 9B:
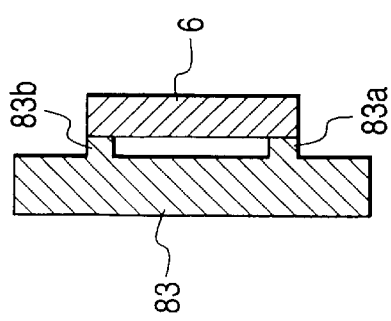
FIG. 9(b) is a traverse cross sectional view taken along the line F—F in FIG. 9(a)

FIGS. 9(a) to 9(c) show the angular rate sensor 82 according to the sixth embodiment of the invention which is different from the first embodiment only in structure of the base 83 and location of laser-welded portions of the fixture 6 and the base 83. Other arrangements are identical, and illustration and explanation thereof in detail will be omitted here.

The base 83 has, as clearly shown in FIGS. 9(b) and 9(c), formed on an upper surface thereof a pair of protrusions 83a and 83b which extend parallel to each other along the length of the base 83 and which have the same height so as to hold the oscillator 4 parallel to the upper surface of the base 83 with a given gap. The attachment of the fixture 6 to the base 83 is achieved by projection-welding portions of the fixture 6 abutting on the protrusions 83a and 83b or laser-welding around those portions. Specifically, only the protrusions 83a and 83b having a smaller volume are welded, so that the quantity of heat transmitted to the fixture 6 during the welding is small, thereby allowing the welding to be performed with less power. The quantity of heat transmitted to the oscillator 4 through the fixture 6 is also small, thereby resulting in decreased thermal damage caused to the oscillator 4 during the welding.

Figure 10A:
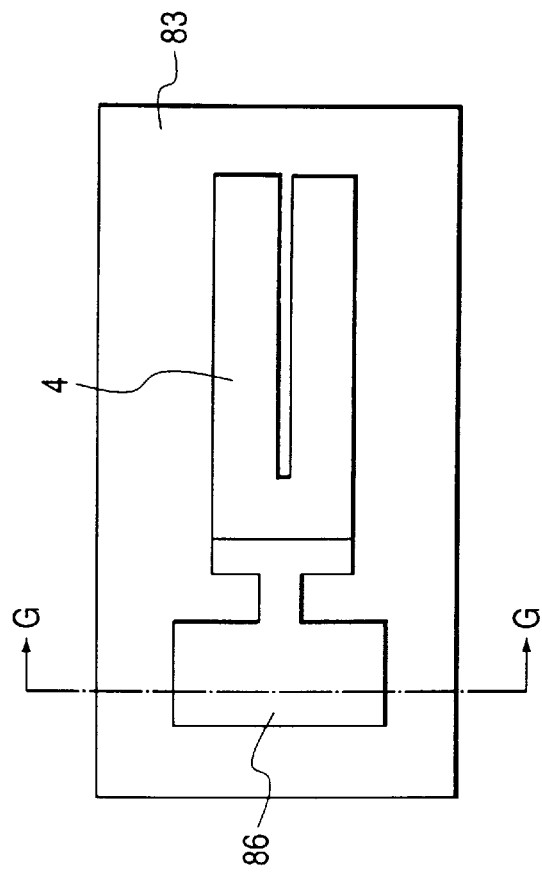
FIG. 10(a) is a plan view which shows a modification of the sixth embodiment in FIGS. 9(a) to 9(c)
Figure 10C:
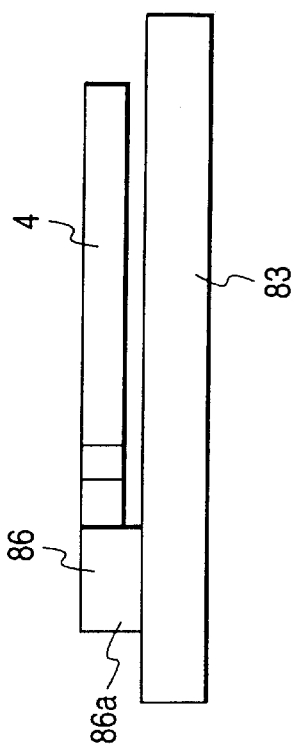
FIG. 10(c) is a side view of FIG. 9(a)
Figure 10B:
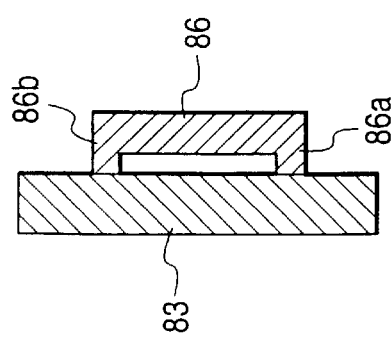
FIG. 10(b) is a traverse cross sectional view taken along the line G—G in FIG. 10(a)

FIGS. 10(a) to 10(c) show a modification of the sixth embodiment.

The protrusions 86a and 86b are formed on the bottom of the fixture 86 instead of the protrusions 83a and 83b of the sixth embodiment. Either of the protrusions 86a and 86b may alternatively formed on the base 83. Other arrangements are identical with those of the sixth embodiment, and explanation thereof in detail will be omitted here.

Figure 11A:
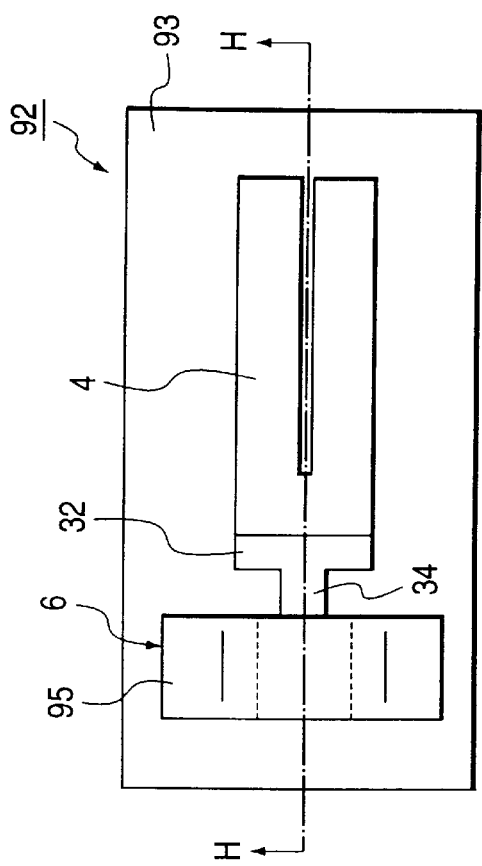
FIG. 11(a) is a plan view which shows an angular rate sensor 82 according to the seventh embodiment of the invention.
Figure 11C:
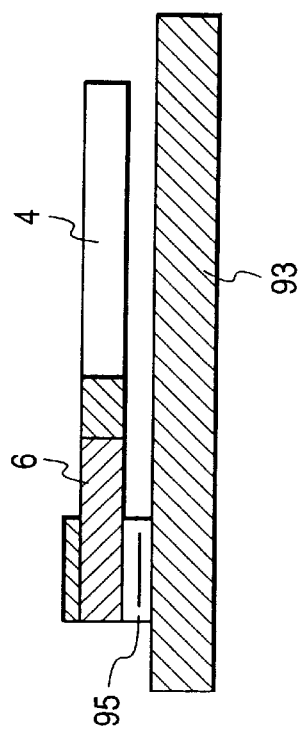
FIG. 11(c) is a longitudinal cross sectional view taken along the line H—H in FIG. 11(a)
Figure 11B:
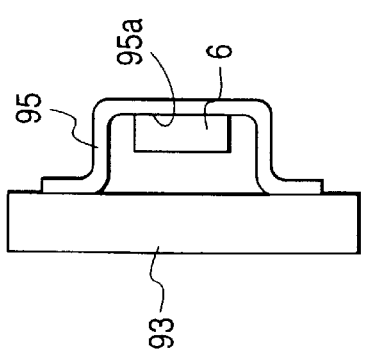
FIG. 11(b) is an end view of FIG. 10(a)

FIGS. 11(a) to 11(c) show the angular rate sensor 92 according to the seventh embodiment of the invention which is different from the fifth embodiment, as shown in FIGS. 7(a) to 7(c), only in structure of the fixture 6 and location of laser-welded portions of the fixture 6 and the base 93. Other arrangements are identical, and illustration and explanation thereof in detail will be omitted here.

The fixture 6 includes the mount portion 32, the connecting portion 34, and the Ω-shaped holder 95. The holder 95 is formed by pressing a metallic plate and connected at end portions thereof to an upper surface of the base 93 by projection welding or laser welding. The holder 95 has the flat inner wall 95a oriented parallel to the upper surface of the base 93. The flat inner wall 95a is connected to the connecting portion 34 by projection welding or laser welding.

Specifically, the attachment of the fixture 6 to the base 93 is accomplished at the end portions of the holder 96 having thin walls, so that the quantity of heat transmitted to the fixture 6 during the welding is small, thereby allowing the welding to be performed with less power. The quantity of heat transmitted to the oscillator 4 through the fixture 6 is also small, thereby resulting in decreased thermal damage caused to the oscillator 4 during the welding.

Figure 12B:
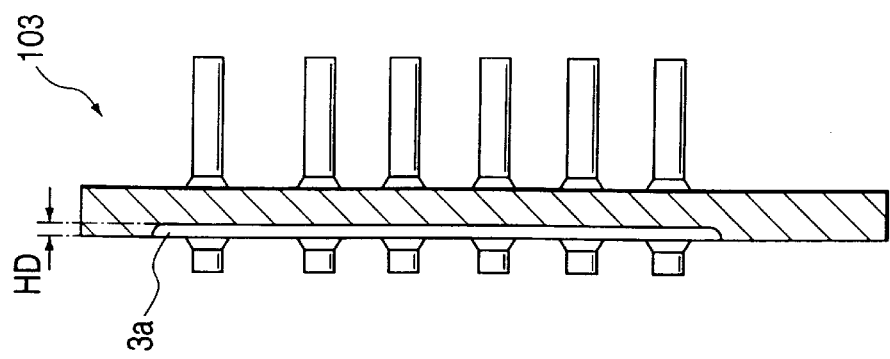
FIG. 12(b) is a longitudinal cross sectional view taken along the line A—A in FIG. 12(a)
Figure 12A:
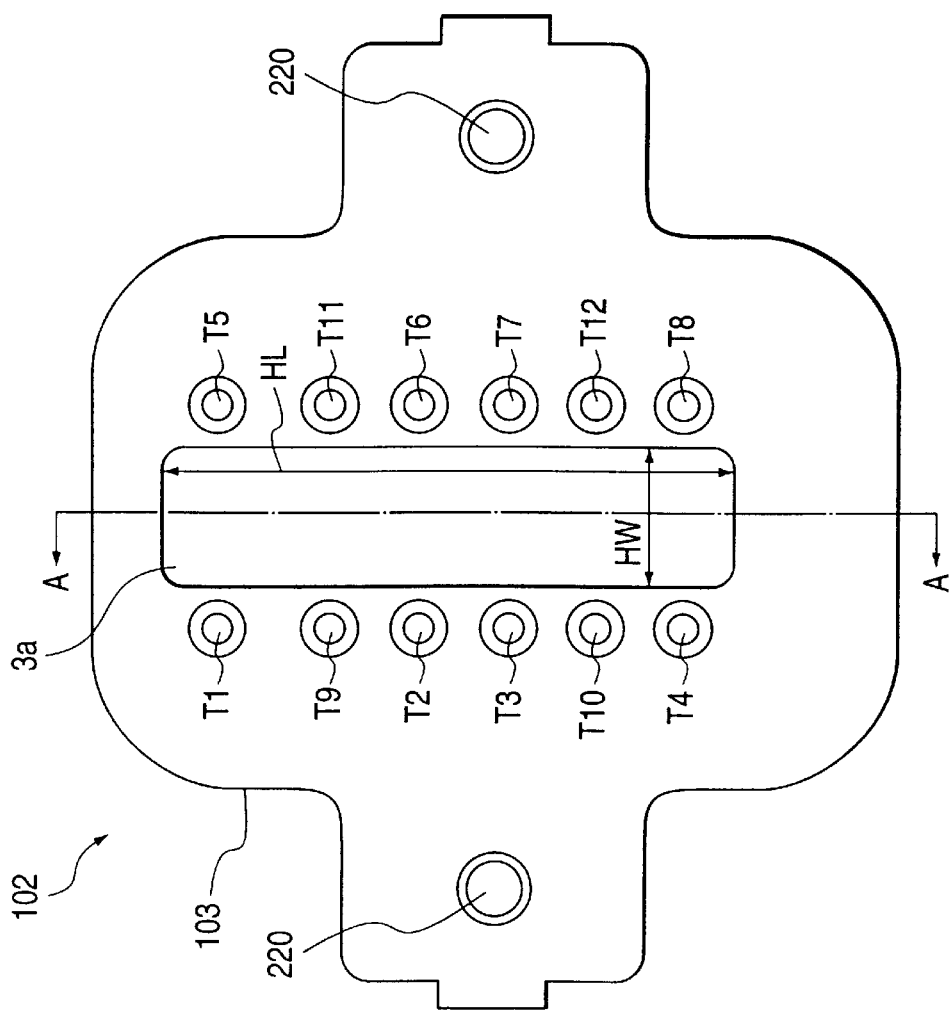
FIG. 12(a) is a plan view of an attachment base of an angular rate sensor according to the eighth embodiment of the invention.

FIGS. 12(a) and 12(b) show the angular rate sensor 102 according to the eighth embodiment of the invention which is different from the first embodiment in structure of the base 103. Other arrangements are identical, and explanation thereof in detail will be omitted here.

The base 103 is made of a steel plate and has formed in an upper surface thereof the recess 3a similar to that in the first embodiment. The twelve terminals T1 to T12 are installed on both sides of the recess 3a in a hermetically sealing fashion. The terminals T1 to T8 are identical with those in the first embodiment as shown in FIG. 1. The mounting holes 220 are formed in side flanges of the base 103 for attachment of the angular rate sensor 102 to a moving object.

In this embodiment, the recess 3a has a length HL of 22.6 mm, a width HW of 5.6 mm, and a depth HD of 0.5 mm and is greater than the oscillator 4 by 2.6 mm in length and 1.2 mm in width. The amplitude of oscillation of the oscillator 4 in a widthwise direction (i.e., the y-axts direction in FIG. 1) is on the order of 8 $\mu$m. The amplitude of vibration of the oscillator 4 in a depthwise direction (i.e., the x-axis direction in FIG. 1) is several nm when the angular rate sensor 102 is moved at a normal angular rate applied to automotive vehicles or portable video cameras. Specifically, the recess 3a has a size enough to avoid collision of the oscillator 4 with the base 103, taking into account assembling errors of the oscillator 4.

The attachment of the oscillator 4 to the fixture 6 is accomplished by holding the back surface of the oscillator 4 flush with the attachment surface 6b of the fixture 6 using a flat reference plate, for example, and bonding the bottom 4a of the oscillator 4 to the attachment surface 6a of the fixture 6 using epoxide resin adhesive. The attachment of the fixture 6 to the base 103 is performed by orienting the fixture 6 relative to the base 103 by bringing a lower edge of a side surface of the base portion 36 of the fixture 6 facing the mount portion 32 into coincidence with a lower end (i.e., a reference line) of the recess 3a and welding the end walls of the base portion 36 to the base 103 as shown in FIG. 1. This orients the arms 12 and 14 of the oscillator 4 parallel to the upper surface of the base 103.

Figure 13A:
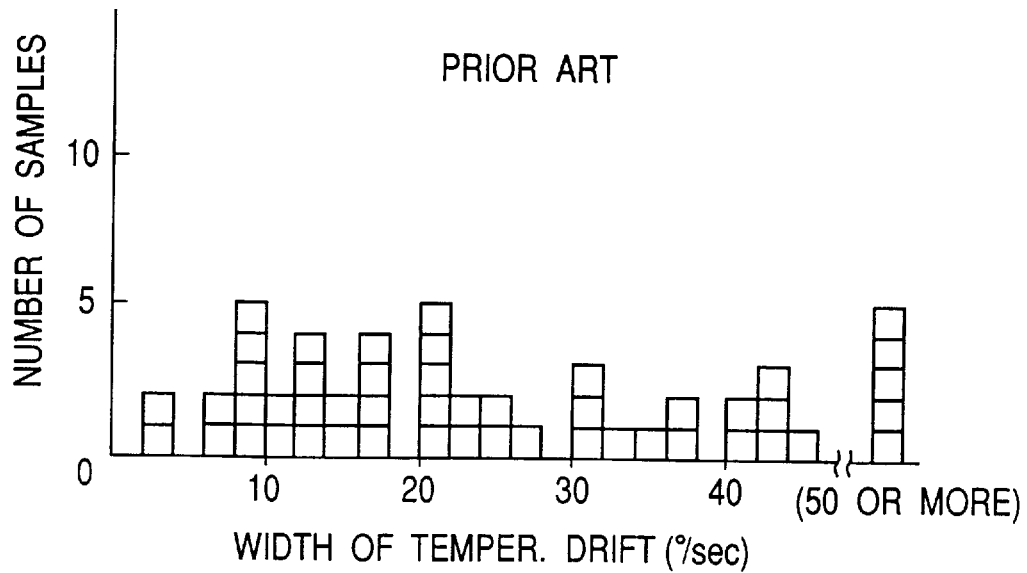
FIG. 13(a) is a graph which shows a variation in temperature drift of an output of a conventional angular rate sensor.
Figure 13B:
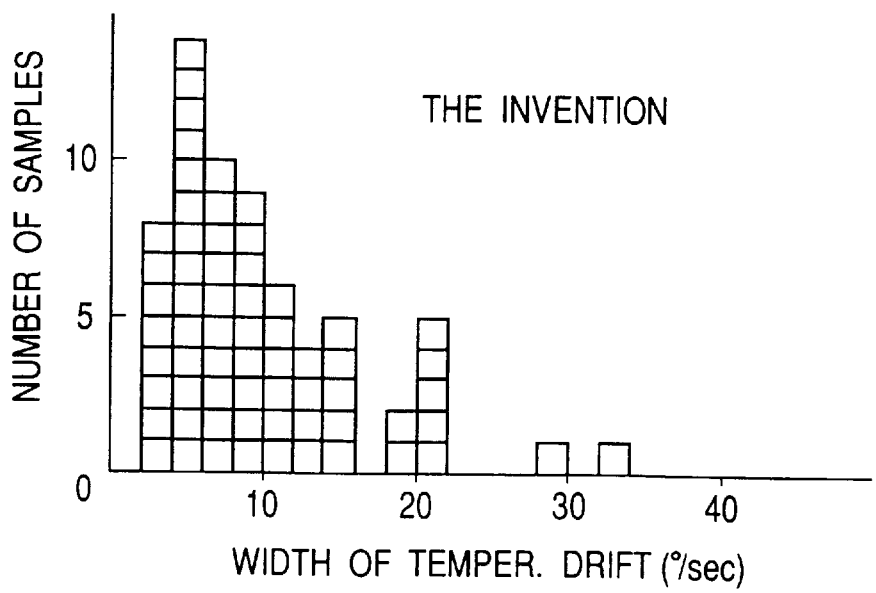
FIG. 13(b) is a graph which shows a variation in temperature drift of an output of an angular rate sensor of the eighth embodiment of the invention.

FIGS. 13(a) and 13(b) show test results indicating the width of a temperature drift in output (i.e., offset voltage) of the angular rate signal caused by the undesired oscillations of the oscillator 4 within a temperature range from −35 to 85° C. in a conventional structure having the base 103 with no recess 3a and the structure of this embodiment. The test results are normalized in terms of sensitivity to the angular rate of the angular rate sensor and show that the width of a temperature drift in the conventional structure ranges over 88°/sec., while that in the structure of this embodiment ranges over 34°/sec.

FIGS. 14(a) and 14(b) show the angular rate sensor 142 according to the ninth embodiment of the invention which is different from the eighth embodiment in structure of the base 143 and the fixture 146. Other arrangements are identical, and explanation thereof in detail will be omitted here.

The rectangular protrusion 143a is formed on a central portion of an upper surface of the base 143 by pressing the base 143 and has the width, as clearly shown in FIG. 14(a), smaller than that of the oscillator 4. The base 143 is, therefore, formed in a bottom surface the recess 143b.

The fixture 146 consists of the mount portion 147, the connecting portion 148, and the base portion 149. The mount portion 147 and the connecting portion 148 are similar to the mount portion 32 and the connecting portion 34, while the base portion 149 has the height enough to hold the oscillator 4 parallel to the upper surface of the base 143 at a given interval away from the protrusion 143a required for avoiding collision of the back surface of the oscillator 4 with the protrusion 143a during excitation of the oscillator 4. The attachment of the fixture 146 to the base 143 is accomplished by bringing a side edge of the base portion 149 facing the mount portion 147 into engagement with a lower end (i.e., a reference line) of the protrusion 143a and bonding or welding the attachment surface 146a to the base 143. This enables the fixture 146 to be positioned on the base 143 with high accuracy.

The formation of the protrusion 143a on the base 143 increases the rigidity of the base 143, thus reducing the vibration of the base 143. This results in improved measurement accuracy of the angular rate.

Figure 15B:
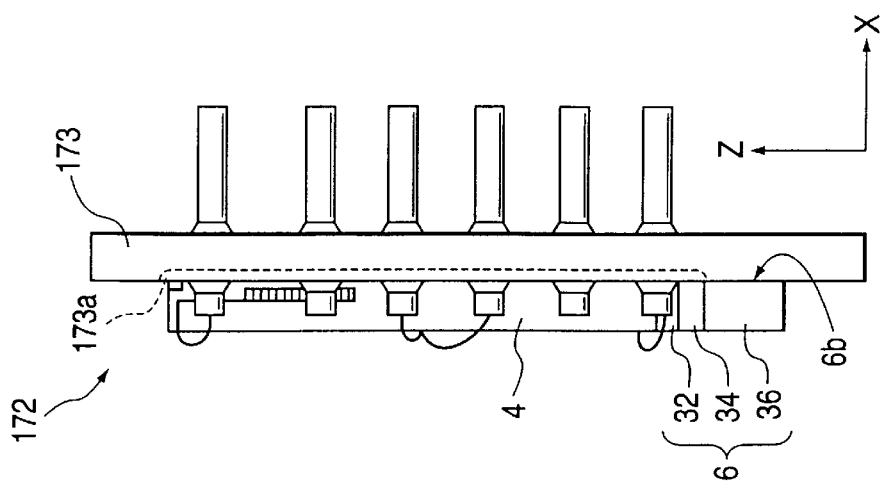
FIG. 15(b) is a side view of FIG. 15(a)
Figure 15A:
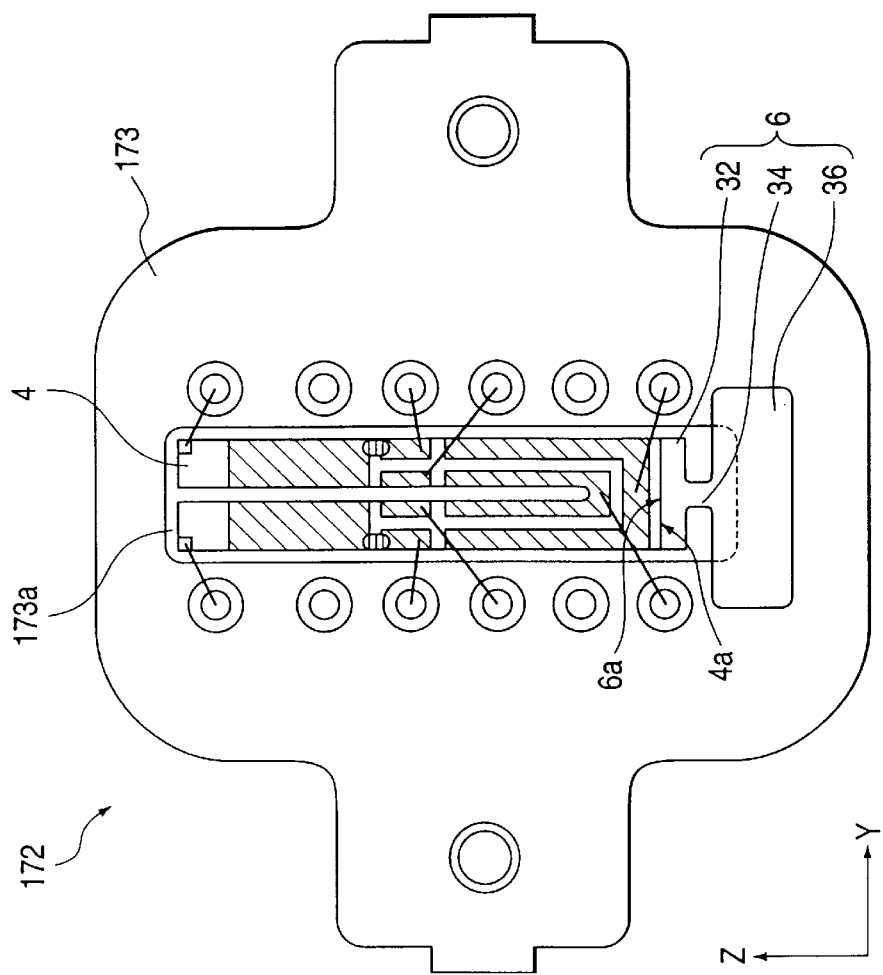
FIG. 15(a) is a plan view which shows an angular rate sensor according to the tenth embodiment of the invention.

FIGS. 15(a) and 15(b) show the angular rate sensor 172 according to the tenth embodiment of the invention which is different from the eighth embodiment in size of the recess 173a formed in the base 173 and locations of welded portions of the fixture 6. Other arrangements are identical, and explanation thereof in detail will be omitted here.

The recess 173a has a length longer than the length HL of the recess 3a of the eighth embodiment so that it may extend up to the underside of the base portion 36 of the fixture 6. Specifically, the base portion 36 partially overlaps with end portion of the recess 173a.

The orientation of the oscillator 4 relative to the base 173 when the angular rate sensor 172 is assembled is easily achieved by arranging the sides of the oscillator 4 parallel to the sides (i.e., reference lines) of the recess 173 at the same interval.

Figure 16:
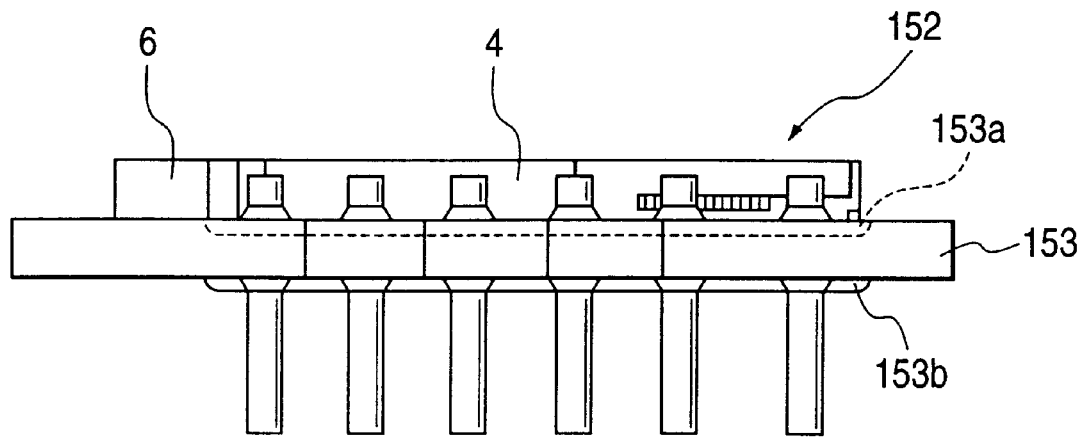
FIG. 16 is a side view which shows a first modification of the tenth embodiment.

FIG. 16 shows a modification of the eighth embodiment.

The base 153 has formed in an upper surface thereof the recess 153a and on a bottom surface the rectangular protrusion 153b by pressing. The recess 153a may have the same size as that of the recess 3a of the eighth embodiment. This structure allows the angular rate sensor 152 to be decreased in thickness and increases the rigidity of the base 153.

Figure 17:
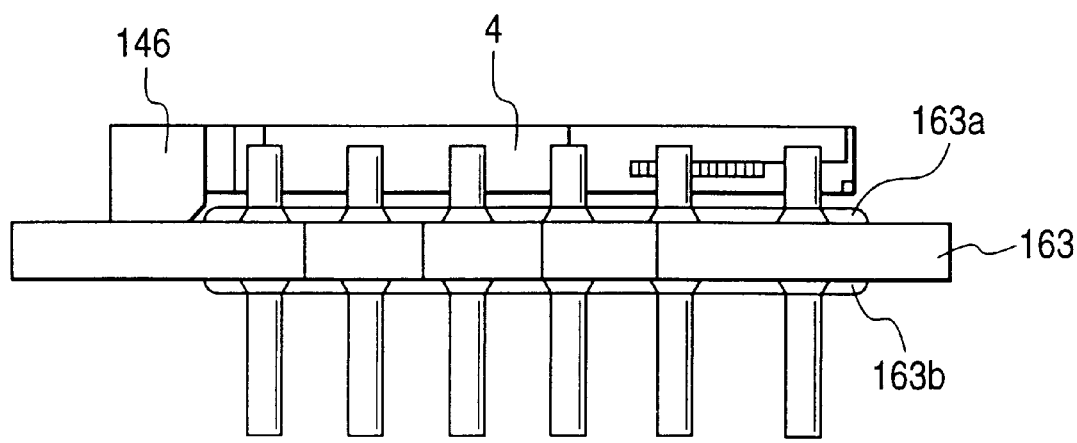
FIG. 17 is a side which shows a second modification of the tenth embodiment.

FIG. 17 shows a modification of the ninth embodiment.

The base 163 has formed on both surfaces protrusions 163a and 163b each of which is identical with the protrusion 153b in FIG. 16. This structure further increases the rigidity of the base 163.

Figure 18A:
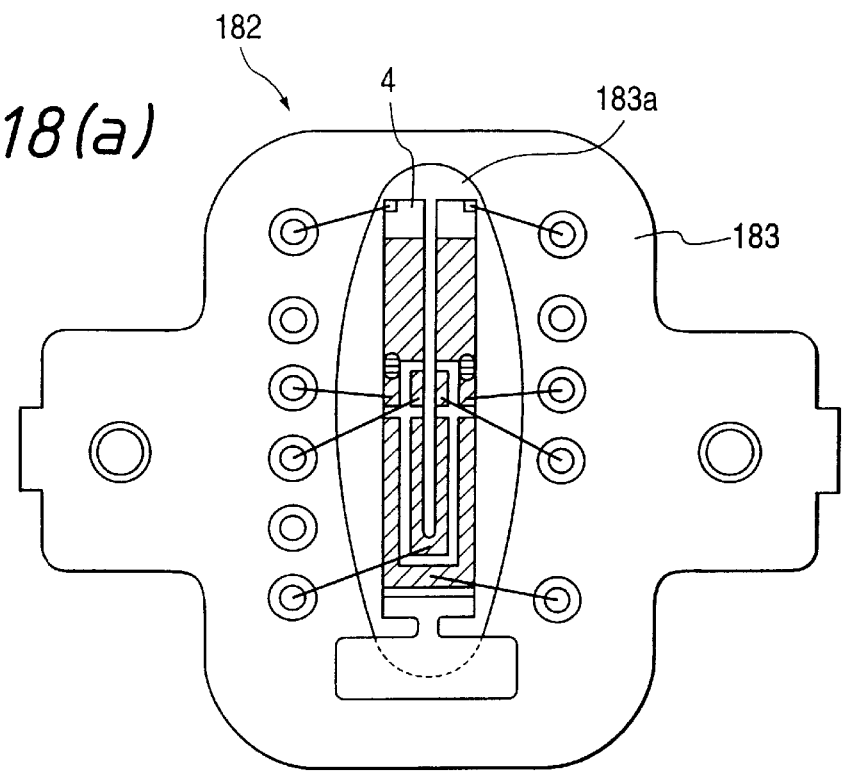
FIG. 18(a) is a plan view which shows an angular rate sensor according to the eleventh embodiment of the invention.

FIG. 18(a) shows the angular rate sensor 182 according to the eleventh embodiment of the invention which is different from the tenth embodiment, as shown in FIGS. 15(a) and 15(b), only in shape of the recess 183a. Other arrangements are identical.

The recess 183 is of oval shape extending along the length of the oscillator 4 and may be formed by pressing the base 183. The recess 183 may alternatively be replaced with a pressed protrusion, like the one shown in FIGS. 14(a) and 14(b).

As apparent from the above discussion, the recess or the protrusion formed in or on the base in each of the above embodiments is used to orient the oscillator 4 relative to the base, that is, to bring the longitudinal center line of the oscillator 4 into coincidence with an axis of rotation (i.e., the z axis) of a moving object whose angular rate is to be measured by the angular rate sensor of the invention. Thus, it is not always necessary to match the shape of the recess or the protrusion with that of the oscillator 4 as long as it can be used for orient the longitudinal center line of the oscillator 4 on the base in a direction of the axis of rotation of the moving object. Specifically, the shape of the recess or the protrusion may be oval, as in this embodiment, or polygonal.

Additionally, a plurality of recess or protrusions may be arranged in or on the base along a given reference line instead of the recess or the protrusion, as described above. The orientation of the oscillator 4 when mounted on the base may be achieved based on the arrangement of the recesses or protrusions.

Figure 18B:
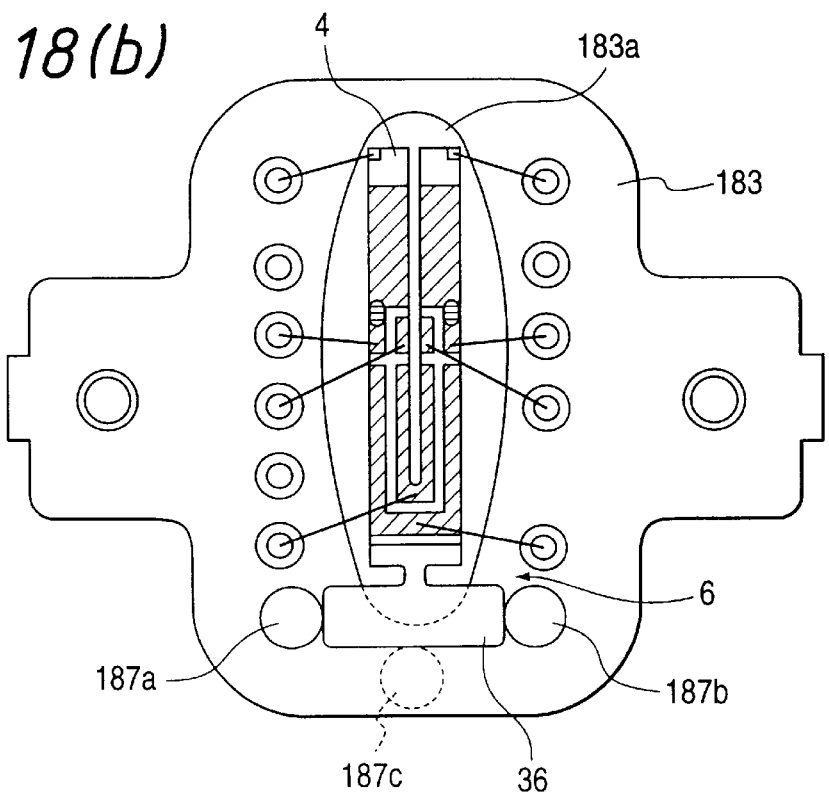
FIG. 18(b) is a plan view which shows a modification of the eleventh embodiment.
Figure 20:
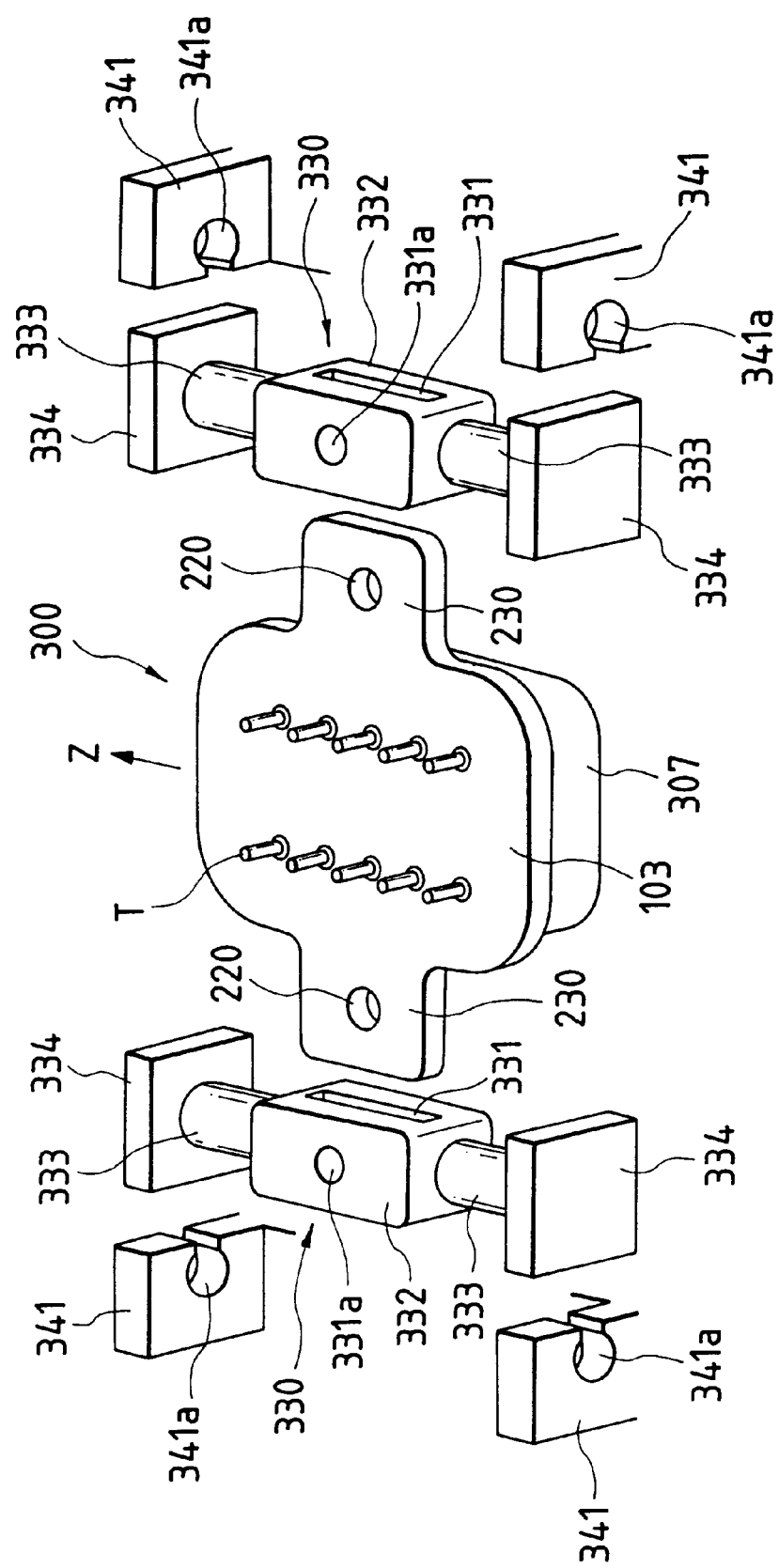
FIG. 20 is a perspective view which shows an angular rate sensor according to the thirteenth embodiment of the invention.

FIG. 18(b) shows a modification of the eleventh embodiment in FIG. 18(a).

The base 183 has formed on an upper surface thereof a pair of cylindrical protrusions 187a and 187b which is used to determine the location of the base portion 36 of the fixture 6 in a widthwise direction of the oscillator 4.

The protrusion 187c, as illustrated by a broken line, may also be formed on the base 183 between the protrusions 187a and 187b for determining the location of the base portion 36 of the fixture 6 in a lengthwise direction of the oscillator 4.

The protrusions 187a to 187c may be formed with a prism or alternatively be replaced with a plurality of recesses for orientation of the fixture 6 relative to the base 183. Additionally, an opening, as will be described below in detail, may be formed in the base 183 instead of the recess 183a for installation therein the oscillator 4. These structures may also be used with all the embodiments, as discussed above.

FIGS. 19(a) and 19(b) show the angular rate sensor 192 according to the twelfth embodiment of the invention.

The base 193 has formed therein the rectangular opening 193a of a size much greater than that of the oscillator 4. The fixture 196 consisting of the mount portion 32 and the connecting portion 34 is formed integrally on an inner end wall of the opening 193a to hold the oscillator 4 inside the opening 193 in alignment with the length of the base 193. Specifically, the attachment surface 6a of the mount portion 32 is machined perpendicular to the length (i.e., the longitudinal center line) of the base 193.

The terminal holder 198 formed by bending or pressing a metallic plate is installed at the flange 198a on the bottom of the base 193 by projection welding and holds the terminals T in the bottom plate 198b so that ends of the terminals T may be arranged on both sides of the oscillator 4 within the opening 193a.

FIGS. 20 to 22(b) show the angular rate sensor 300 according to the thirteenth embodiment of the invention.

The angular rate sensor 300 includes the base 103, the oscillator 4, and the shell or cover 307. The cover 307 is made, for example, by pressing a metallic plate and hermetically installed on an upper surface of the base 103 to protect the oscillator 4 from the ingress of dirt, dust, and moisture. The structure of the base 103 and attachment of the oscillator 4 to the base 103 may utilize those disclosed in any one of the above embodiments, and explanation thereof in detail will be omitted here. Specifically, this embodiment features the installation of the angular rate sensor 300 in the housing 340, as shown in FIGS. 22(a) and 22(b).

The angular rate sensor 300 is supported by the housing 340 using two vibration isolators 330. Each of the vibration isolators 330 is made of a single silicone rubber member and includes mount bases 334, cylindrical damper shafts 333, and holder 332. The holder 332 has formed therein the slit 331 for insertion of the flange 230 of the base 103 of the sensor 300 and the threaded hole 331a for installation of the base 103 to the vibration isolator 330. The damper shaft 333 connects the holder 332 and the mount base 334 and works as a damper to absorb the vibration transmitted from the mount base 334 (i.e., the housing 340) to the angular rate sensor 300.

The housing 340 is, as shown in FIGS. 22(a) and 22(b), made of a box-like member whose one surface is opened and has mounting portions (not shown) for attachment to a spinning object. Four bearing bases 341 are secured on inner side walls of the housing 340. Each of the bearing bases 341 has formed therein the circular opening 341a for bearing or holding one of the damper shafts 333 tightly.

The installation of the angular rate sensor 300 on the vibration insulators 330 is achieved by inserting the flanges 230 of the base 103 into the slits 331 of the holders 332, interposing the rubber spacers 350, as shown in FIGS. 21(a) and 21(b), between the slits 331 and the flanges 230, passing screws 360 through the threaded holes 220 of the base 103 and the threaded holes 331a of the holders 332, and tightening the screws 360.

The angular rate sensor 300 is, as clearly shown in FIGS. 22(a) and 22(b), held by the vibration isolators 330 so that the longitudinal center line of the base 103 may lie parallel to those of the vibration isolators 330. The vibration isolators 330 are supported by the bearing bases 341 within the housing 340 so that the longitudinal center line of the base 103 or the length of the oscillator 4 may be oriented to the z axis when the housing 340 is mounted on a given place of the moving object.

The four damper shafts 333 are arranged on a plane including the center of gravity of the angular rate sensor 300 diametrically across the center of gravity of the angular rate sensor 300.

Specifically, the damper shafts 333 lie flush with the base 103 since the angular rate sensor 300 is thin as a whole and the center of gravity thereof lies near the surface of the base 103. Therefore, the elastic force of each of the damper shafts 333 acts on the plane flush with the base 103. The resultant elastic center of the elastic centers of all the damper shafts 333, as will be described later in detail, agrees with the center of gravity of the angular rate sensor 300.

The installation of the angular rate sensor 300 in the housing 340 after mounted on the vibration isolators 330 is accomplished by fitting the damper shafts 333 into the openings 341a of the bearing bases 341 in contact of the mount bases 334 with the bearing bases 341. The vibration isolators 330 are disposed within the housing 340 so that they are slightly compressed in the lengthwise direction thereof, thereby causing the elastic force of the damper shafts 333 to act outward to urge the mount base 334 into constant engagement with the inner wall of the housing 340. This holds the vibration isolators 330 tightly within the housing 340. The angular rate sensor 300 is, as described above, installed on, for example, an automotive vehicle. In this case, the housing 340 is secured within a console box so that the length of the oscillator 4 (i.e., the z axis) is oriented vertically.

Figure 23B:
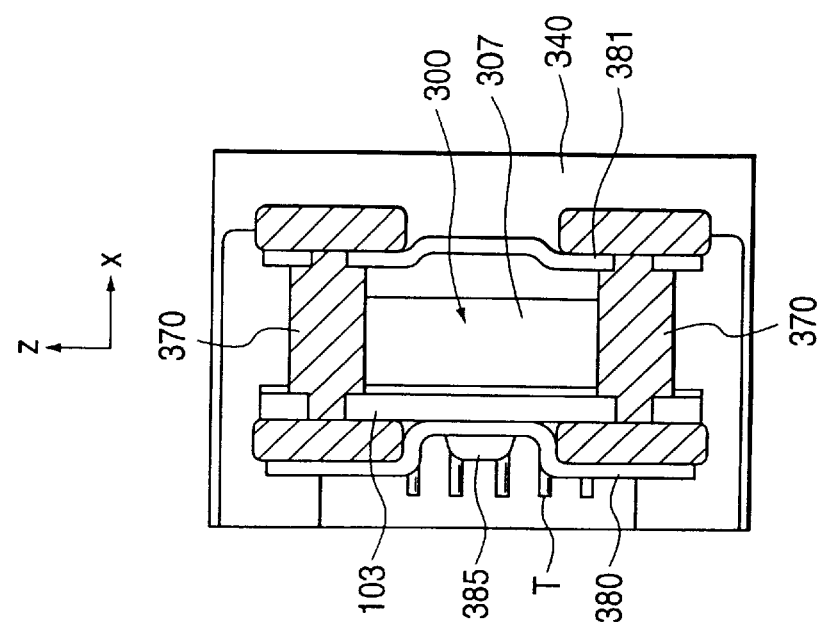
FIG. 23(b) is a side view of FIG. 23(a)
Figure 23A:
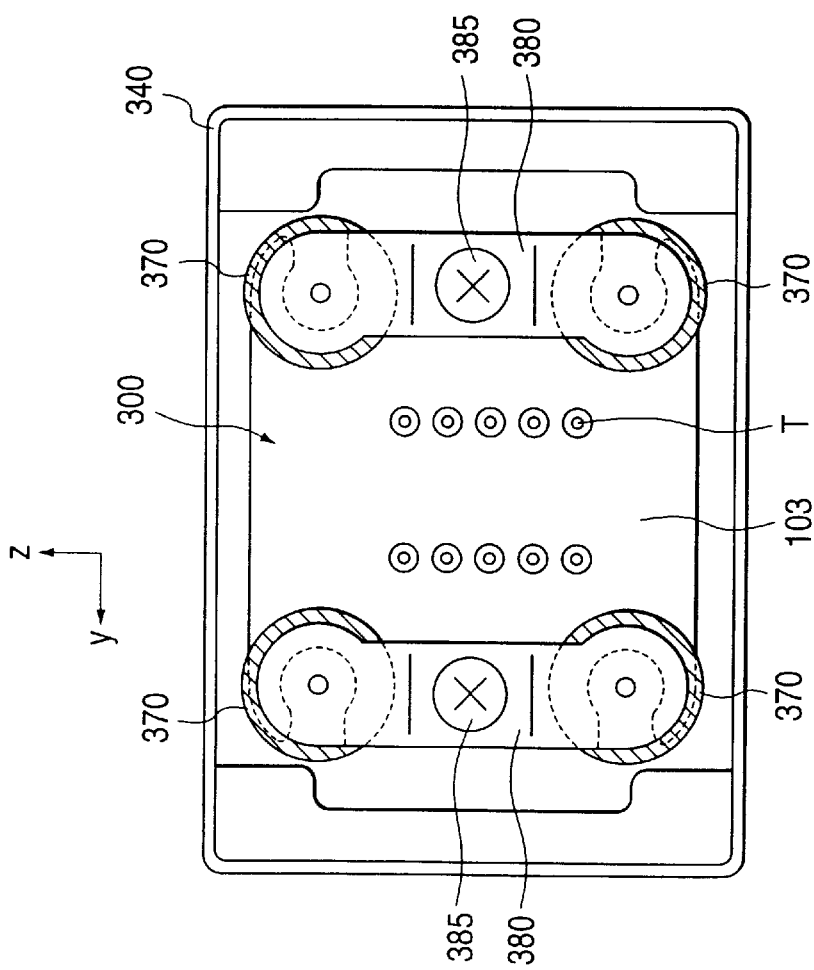
FIG. 23(a) is a plan view which shows a conventional vibration proofing structure for tests.

FIGS. 23(a) and 23(b) show a conventional vibration proofing structure made by the inventors for comparison with this invention.

The angular rate sensor 300 is the same as that shown in the above embodiment except for the shape of the base 103.

The four vibration isolators 370 made from rubber are arranged perpendicular to the base 340. The base 340 lies parallel to the z-axis. Specifically, the longitudinal center line of each of the vibration isolators 370 extends in the direction of the x-axis.

The vibration isolators 370 are secured at ends thereof on the base 103 through the rubber spacers 380 using the screws 385 and at other ends on an inner wall of the housing 340 through rubber sheets 380 using screws (not shown).

Figure 24A:
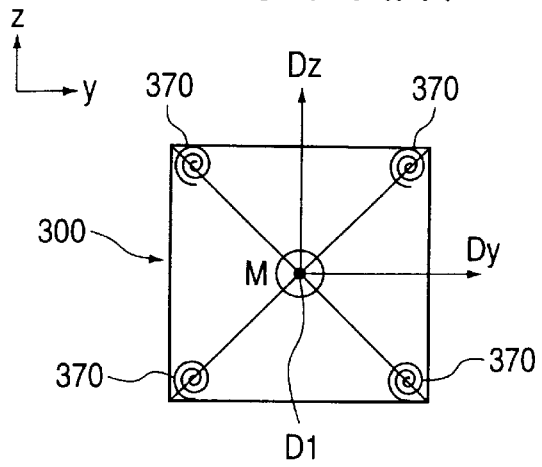
FIGS. 24(a) to 24(c) and FIG. 25 show a physical mode of the conventional vibration proofing structure shown in FIGS. 23(a) and 23(b)
Figure 24B:
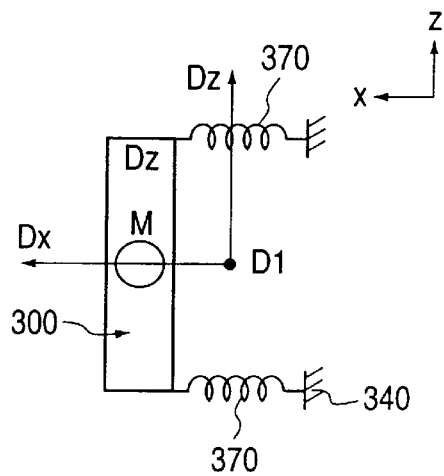
Figure 24C:
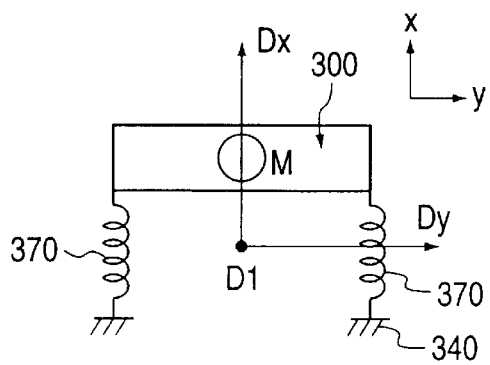
Figure 25:
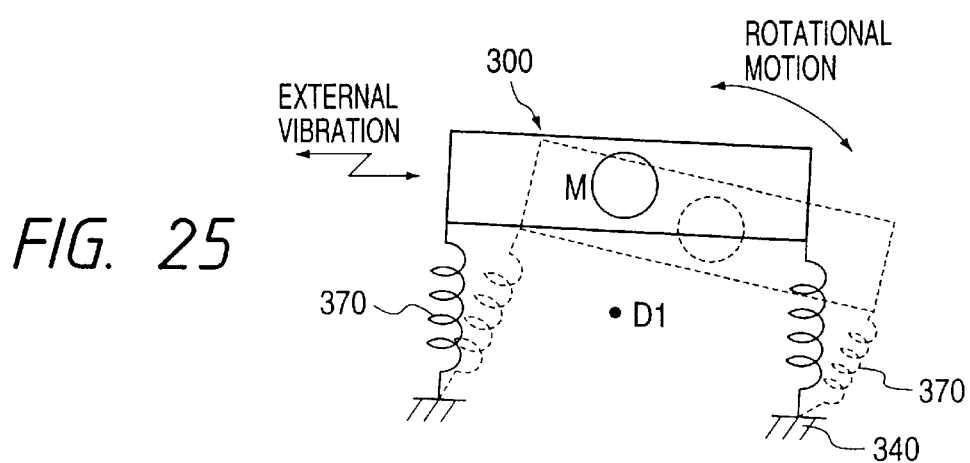

FIGS. 24(a) to 24(c) show a physical model of the conventional vibration proofing structure in FIGS. 23(a) and 23(b).

Usually, when the pressure is applied to a rubber cushion, it will cause the rubber cushion to be deformed in the same direction as the pressure and three axes to arise which do not undergo any angular displacement. Such axes are called principal elastic axes. When a line of action of pressure applied to the rubber cushion passes through the elastic center (i.e., an intersection of the three principal elastic axes), the rubber cushion is deformed in a direction parallel to the applied pressure without experiencing any angular deformation.

In FIGS. 24(a) to 24(c), the resultant principal elastic axes of the principal elastic axes of all the vibration isolators 370 are expressed by arrows Dx, Dy, and Dz in a rectangular coordinate system defined by x, y, and z axes oriented in the same directions as those shown in FIG. 1. Each black point D1 indicates the resultant elastic center.

In the conventional vibration proofing structure shown in FIGS. 24(a) to 24(c), the four vibration isolators 370, as illustrated as springs, are arranged perpendicular to the angular rate sensor 300. The resultant elastic center D1 of the vibration isolators 370, thus, lies between the angular rate sensor 300 and the housing 340 away from the center of gravity M of the angular rate sensor 300. In this case, when vibrations are, as shown in FIG. 35, generated in the y- and z- axis directions, it will cause the angular moment to be produced between the resultant elastic center D1 and the center of gravity M, resulting in angular displacement or rotational motion of the vibration proofing structure.

Particularly, when vibrations are generated in the y-axis direction, it will cause the vibration proofing structure to experience a rotation around the z axis. Specifically, the angular rate arises around an axis extending parallel to the length of the oscillator 4 at equal intervals away from the arms 12 and 14, so that the angular rate sensor 300 detects that angular rate in error as an angular rate arising from actual rotational motion of the angular rate sensor 300.

The vibration proofing structure of the invention, as shown in FIGS. 20 to 22(b), is designed for avoiding the above problem. The operation thereof will be described below using a physical model shown in FIGS. 26(a) to 27.

In FIGS. 26(a) to 27, the resultant elastic center that is an intersection of the resultant principal elastic axes of the vibration isolators 330 or the damper shafts 333 is expressed by D2.

The vibration proofing structure of this invention is different from the above described conventional vibration proofing structure in that the resultant elastic center D2 of the damper shafts 333 coincides with the center of gravity M of the angular rate sensor 300. Thus, even if vibrations act on the angular rate sensor 300 from any directions, the rotational moment is not produced. For example, when a vibration is, as shown in FIG. 27, produced in the y-axis direction, the angular rate sensor 300 undergoes only a displacement parallel to the direction of the vibration and does not detect the vibration as the angular rate in error.

Figure 28A:
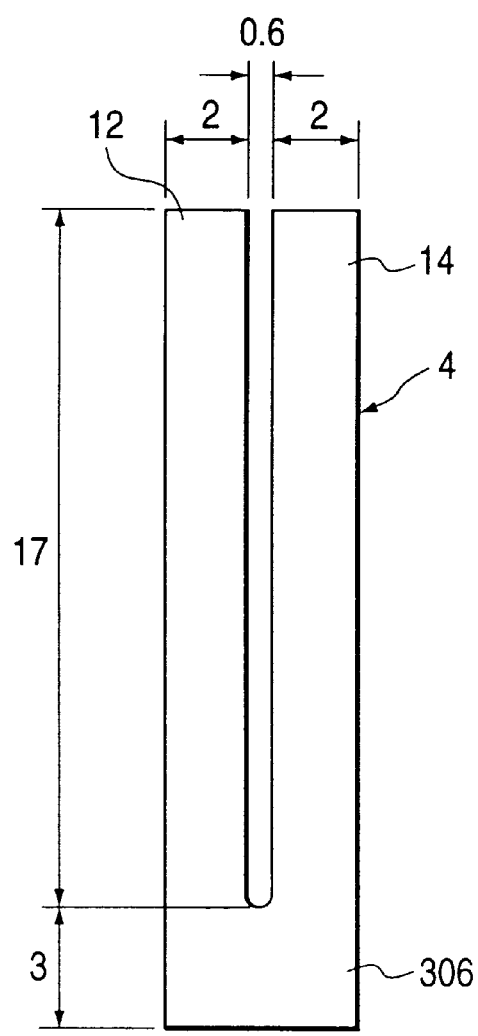
FIG. 28(a) is a plan view which an oscillator.
Figure 28B:
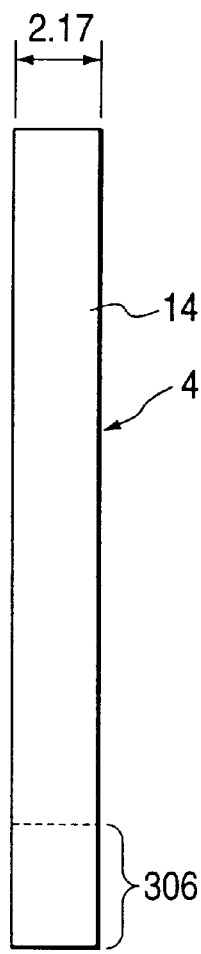
FIG. 28(b) is a side view of FIG. 28(a)

The oscillator 4 used in this embodiment is made from PZT ceramic and has, as shown in FIG. 28, a thickness of 2.17 mm. The arms 12 and 14 have a width of 2 mm and a length of 17 mm and are spaced 0.6 mm. The length of the connection 306 is 3 mm.

The total length of the oscillator 4 in the z-axis direction is thus 20 mm.

The frequency of vibration of the oscillator 4 is set to 3.2 kHz. The vibration damping characteristics or size and hardness of the vibration isolators 330 are so determined that the damper shafts 333 dampen a vibration of 3.2 kHz by −40 dB. The vibration isolators 330 are made from silicone rubber whose hardness Hs (JIS-C-2323) is 60.

FIGS. 29(a) to 29(c) show vibration sensitivities to vibrations acting from x-, y-, and z-axis directions on the angular rate sensors 300 in the conventional vibration proofing structure, as shown in FIGS. 23(a) and 23(b), and the vibration proofing structure of this invention, as shown in FIGS. 20 to 22(b). The vibration sensitivity is a sensor output (i.e., an offset voltage) when the angular rate sensor 300 is shaken by an exciter and expressed in the graphs as a value (°/S) derived by dividing a sensor output (voltage: V) when the angular rate sensor 300 is excited at 3.2 kHz and 0.1 G by a sensor output (sensitivity: V/°/S) when a unit angular rate is applied to the angular rate sensor 300. In the following discussion, the conventional vibration proofing structure will be referred to as a structure A, and the vibration proofing structure of this invention will be referred to as a structure B.

As apparent from the graphs, the structure B is smaller in the vibration sensitivities to vibrations in all the directions or sensor output errors. Particularly, the vibration sensitivities to the vibrations in the x- and y-axis directions are much smaller. This is due to the fact that the resultant elastic center D2 of the damper shafts 33 coincides with the center of gravity M of the angular rate sensor 300 and particularly based on the fact that the structure B orients the length of each of the damper shafts 333 in the z-axis direction, that is, that the direction in which each of the damper shafts 333 is compressed is neither of the x- and y-axis directions and a shearing direction in which the resonance frequency is small.

Figure 30:
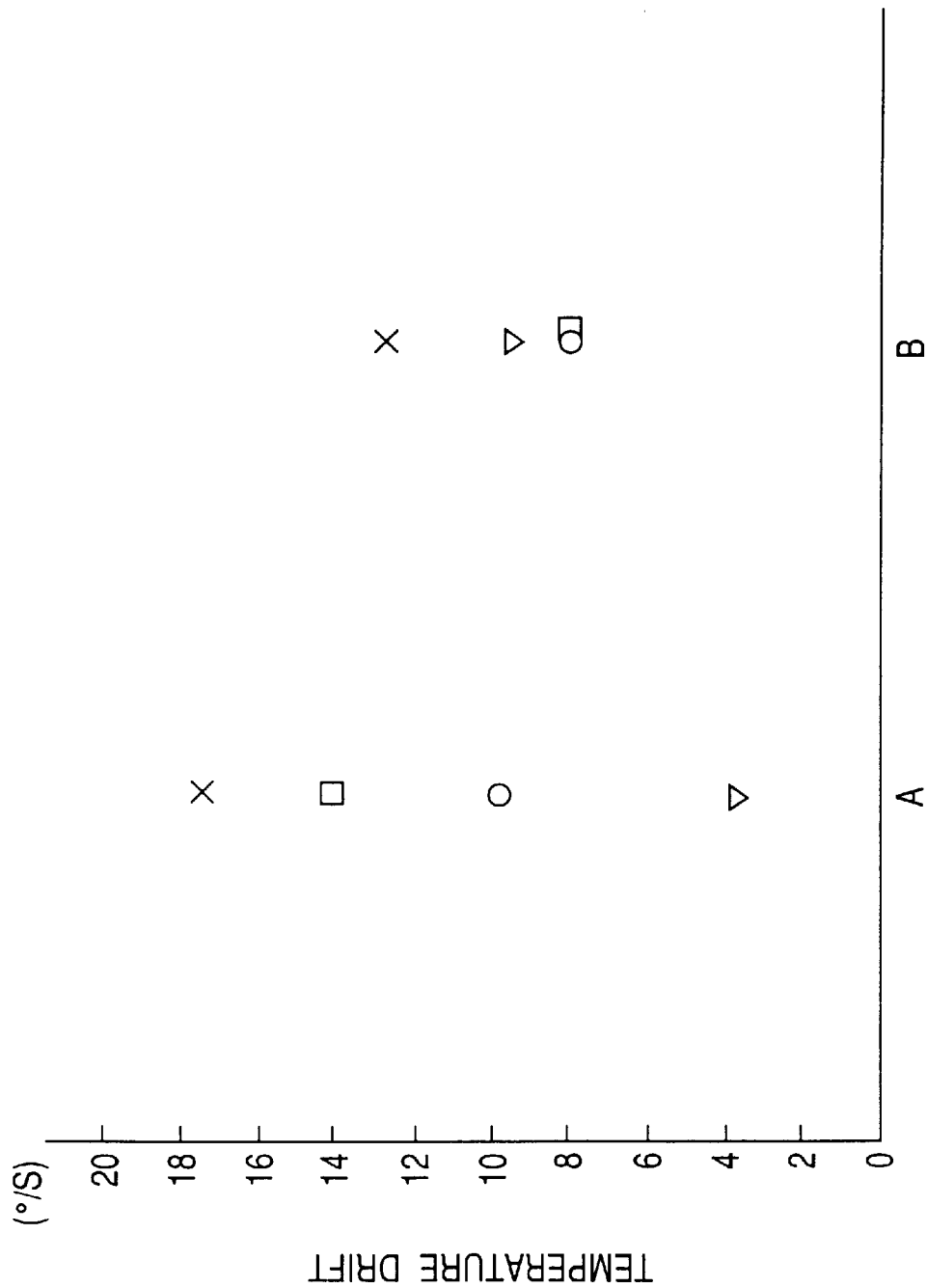
FIG. 30 is a graph which shows temperature drifts in output of the angular rate sensors having the vibration proofing structure of the thirteenth embodiment in FIG. 20 and the conventional vibration proofing structure in FIGS. 23(a) and 23(b)

FIG. 30 shows temperature drifts in output of the angular rate sensors 300 in the structures A and B.

The temperature drift and a variation thereof in the structure B is, as apparent from the graph, smaller than those in the structure A. This is because a rotational vibration of the oscillator 4 around the z axis induced by an excited oscillation of the oscillator 4 is damped by the above described vibration proofing characteristics of the structure B.

In the above embodiment, each of the vibration isolators 330 is so arranged that the length of the damper shaft 333 is oriented in the z-axis direction, but the length of the damper shaft 333 may alternatively be oriented in the y-axis direction. Additionally, additional vibration isolators may also be provided which are oriented in the z- and y-axis directions or other directions.

Figure 31C:
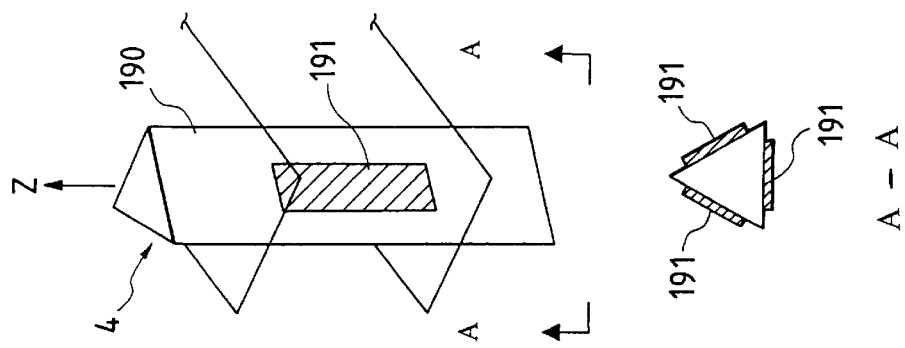
FIGS. 31(a) to 31(c) are perspective views which show modifications of an oscillator.
Figure 31B:
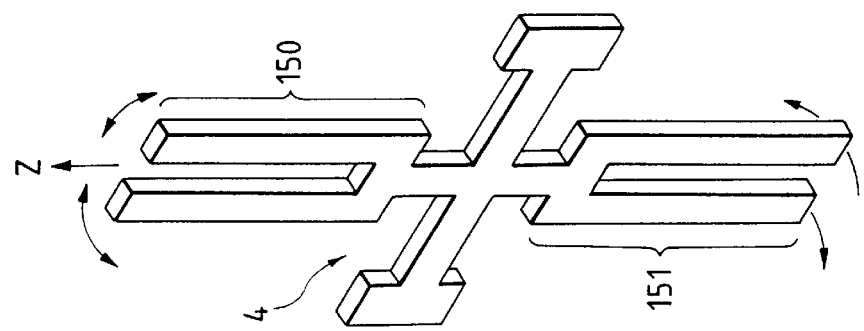
Figure 31A:
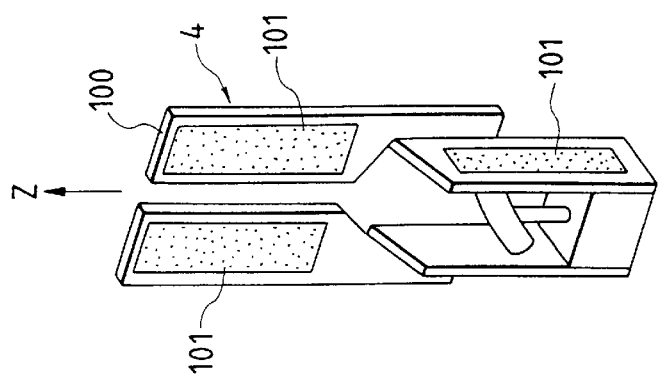

FIGS. 31(a) to 31(c) show modifications of the oscillator 4 used in the above embodiments.

The oscillator 4 in FIG. 31(a) includes the metallic plate 100 and PZT elements 101 attached to surfaces of the metallic plate 100.

The oscillator 4 in FIG. 31(b) includes the excitation tuning fork 150 vibrated by input of an excitation signal and an angular rate sensitive tuning fork 151 vibrated in response to generation of the angular rate.

The oscillator 4 in FIG. 31(c) includes the excitation member 190 made of a metallic triangular pole, the excitation/detection PZT elements 191, and the feedback PZT element 192. The excitation/detection PZT elements 191 are attached to two of side surfaces of the excitation member 190. The feedback PZT element 192 is attached to the remaining one.

The oscillator 4 may alternatively consist of a circular or square metallic pole and a piezoelectric (PZT) film attached to the pole. The pole may also be made of a crystal piezoelectric element or a silicone piezoelectric element.

FIG. 32 shows the angular rate sensor unit 420 according to the fourteenth embodiment of the invention that has a modified form of the vibration proofing structure of the thirteenth embodiment.

Figure 33A:
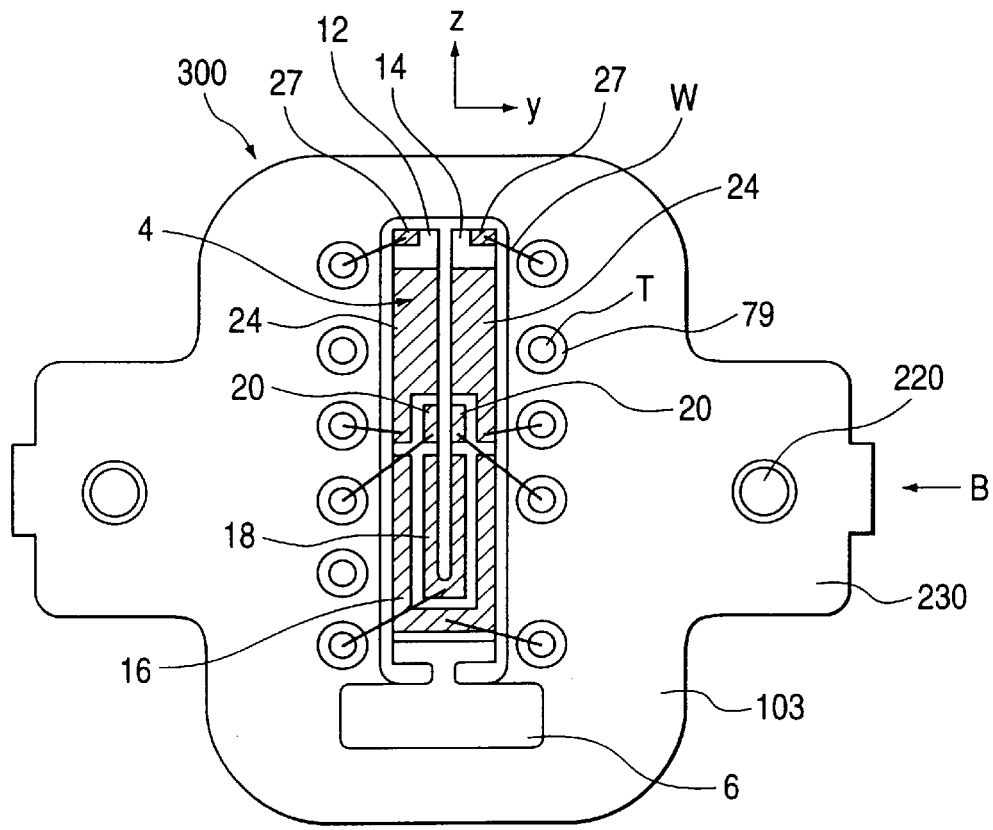
FIG. 33(a) is a plan view which shows an angular rate sensor held by the vibration proofing structure shown in FIG. 32.
Figure 33B:
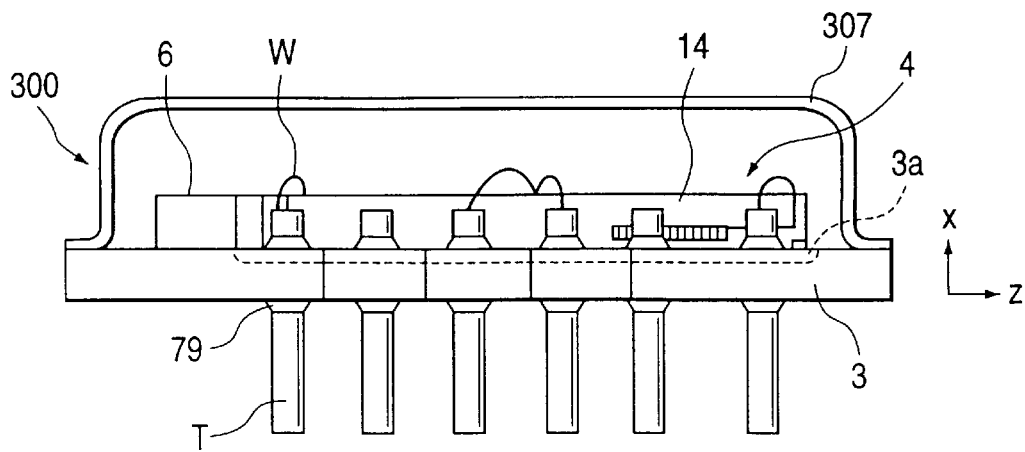
FIG. 33(b) is a side view as viewed from an arrow B in FIG. 33(a)

The angular rate sensor unit 420 generally includes the casing 410, the angular rate sensor 300, the vibration isolators 330, the mount frame 465, the flexible connector 470, the circuit board 480, and the connector box 490. The casing 410 is secured on a moving object such as an automotive vehicle. The mount frame 465 installs the vibration isolators 330 in the casing 410. The circuit board 480 has disposed thereon an excitation signal generator and an angular rate detector. The excitation signal generator outputs excitation signals to the oscillator 4 of the angular rate sensor 300. The angular rate detector receives an output of the angular rate sensor 300 to determine the angular rate of the moving object. The flexible connector 470 connects the terminals T of the angular rate sensor 300 and the circuit board 480 and has disposed thereon an operational amplifier. The connector box 490 has disposed therein power supply terminals for supplying the power to the circuit board 480 and a sensor signal output terminal for outputting a sensor signal indicating the angular rate determined by the angular rate detector on the circuit board 480 to, for example, an electronic control unit mounted in the automotive vehicle. The angular rate sensor 300 has the structure, as shown in FIGS. 33(a) and 33(b), which is identical with that of the thirteenth embodiment in FIGS. 20 to 22(b) (i.e., the structure of the eighth embodiment), and explanation thereof in detail will be omitted here. The vibration isolators 330 are identical in operation with those of the thirteenth embodiment, but different therefrom slightly in structure as discussed later.

The casing 410 is formed with an aluminum box made by die casting and has formed at four corners of the inner wall 411 the seats 410a (only two are shown in FIG. 32 for brevity of illustration) which have U-shaped grooves for holding the vibration insulators 330 within the casing 410. The casing 410 has also formed on an outer wall thereof the flange 410b for attachment to the moving object. When the moving object is an automotive vehicle, the casing 410 is mounted so as to orient the angular rate sensor 300 (i.e., the oscillator 4) vertically.

Each of the vibration isolators 330 is made of a one-piece rubber cushion and includes mount bases 334, damper shafts 333, and holder 332. The holder 332 has formed therein the slit 331 for insertion of the flange 230 of the base 103 of the angular rate sensor 300 and the threaded hole 331a for installation of the base 103 to the vibration isolator 330. The damper shaft 333 connects the holder 332 and the mount base 334 and works as a damper to absorb the vibration transmitted from the mount base 334 (i.e., the casing 410) to the angular rate sensor 300. The mount base 334 is fitted into one of the seats 410a of the casing 410 to secure the angular rate sensor 300 within the casing 410 elastically.

Figure 34B:
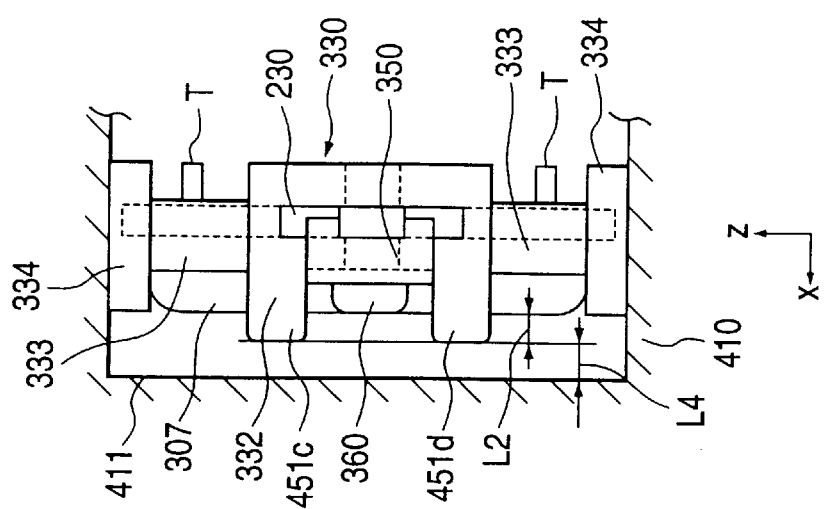
FIG. 34(b) is a side view of FIG. 34(a)
Figure 34A:
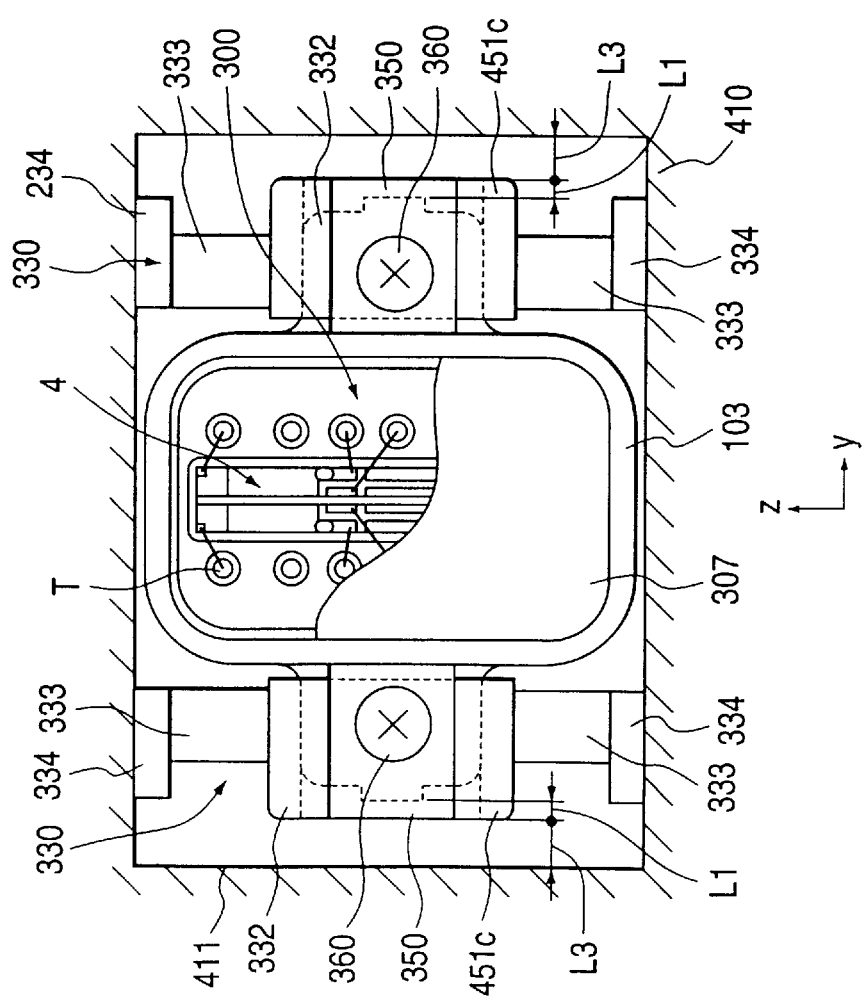
FIG. 34(a) is a perspective diagram as viewed from an arrow A in FIG. 32.

Each of the holders 332 includes, as clearly shown in FIGS. 34(a) and 34(b), the side wall 451c and a pair of legs 451d. The side wall 451c has a thickness L1 between an outer surface thereof and an end of the flange 230 in the y-axis direction (the thickness L1 will be referred to as a y-axis protrusion, hereinafter). Each of the legs 451d includes an extension which projects by a distance L2 from an upper wall of the cover 307 (or a head of the screw 360) toward the inner wall of the casing 410 in the x-axis direction (that extension will be referred to as an x-axis protrusion, hereinafter). The y-axis protrusion and the x-axis protrusion work as dampers.

Each of the vibration isolators 330 are disposed within the casing 410 so that the y-axis protrusion and the x-axis protrusion of each of the holder 332 may be arranged at intervals L3 and L4 away from the inner wall 411. The intervals L3 and L4 are so determined as to avoid collision of the holders 332 with the inner wall 411 of the casing 410 even when the holders 332 undergo a maximum deformation caused by the movement of the angular rate sensor 300 during normal usage in which the angular rate sensor 300 is free from accidental impact. For example, the intervals L3 and L4 are approximately 2 mm. This avoids direct transmission of vibrations from the casing 410 to the holders 332.

The x-axis and y-axis protrusions of the holders 332 of the vibration isolators 330 project, as described above, from the flanges 230 of the base 103 of the angular rate sensor 300 in the x-axis and y-axis directions, while the damper shafts 332 extend in the z-axis direction. Specifically, the x-axis and y-axis protrusions of the holders 333 and the damper shafts 332 work as dampers independently to absorb vibrations acting on the angular rate sensor 300 in x-, y-, and z-axis directions.

The mount frame 65 has formed thereon four protrusions 465a in which U-shaped grooves are formed. The U-shaped grooves receive therein the mount bases 334 of the vibration isolators 330 to hold them in the seats 410a of the casing 410. The flexible connector 470 receives in openings thereof the terminals T of the angular rate sensor 300 to establish electric connections with terminals (not shown) formed on the circuit board 480. The circuit board 480 is installed within the casing 410 through the mount frame 465 using screws (not shown). The connector box 490 is attached to the casing 410 by inserting screws (not shown) into threaded holes 410c formed in four corners of the casing 410 in electric connection with the circuit board 480.

The damper shafts 333 are designed taking into account the vibration power spectrum in the normal environmental condition. For example, the primary natural frequency of a spring/mass system defined by the damper shafts 333 and the angular rate sensor 300 is set to 100 to 300 Hz so that a vibration of 3.2 kHz that is a frequency of excitation signals input to the oscillator 4 is attenuated by −40 dB or more. It is also advisable that the damping factor of the damper shafts 333 be less than or equal to 0.5 in terms of the vibration-attenuating ability. This allows vibrations within a frequency band near 3.2 kHz or an odd multiple of 3.2 kHz transmitted from the casing 410 to be absorbed by the damper shafts 333 of the vibration isolators 330.

It is advisable that the material of the damper shafts 333 be selected taking into account a change in spring coefficient due to a change in ambient temperature. Usually, silicone rubber exhibits a smaller temperature-caused change in spring coefficient and is suitable for the material of the damper shafts 333.

FIGS. 35(a) to 35(c) show a physical model of the vibration proofing structure of this embodiment.

In FIGS. 35(a) to 35(c), the resultant principal elastic axes of the principal elastic axes of all the damper shafts 333 are, similar to FIGS. 24(a) 26(c), expressed by arrows Dx, Dy, and Dz in a rectangular coordinate system defined by x, y, and z axes oriented in the same directions as those shown in FIG. 1. Each black point D1 indicates the resultant elastic center.

The vibration proofing structure of this embodiment is so designed that the resultant elastic center D2 of the damper shafts 333 coincides with the center of gravity M of the angular rate sensor 300. Thus, even if vibrations act on the angular rate sensor 300 from any directions, the rotational moment is not produced. For example, when a vibration is, as shown in FIG. 36, produced in the y-axis direction, the angular rate sensor 300 undergoes only a displacement parallel to the direction of the vibration and does not detect the vibration as the angular rate in error.

The excited oscillation and angular rate-caused movement of the oscillator 4 are, as described above, oriented in x- and y-axis directions perpendicular to the z axis. The shearing direction of each of the damper shafts 333 in which the resonance frequency is small is oriented to a direction perpendicular to the z axis. This minimizes unwanted vibrations impinging upon the excited oscillation and the angular rate-caused movement of the oscillator 4.

The lengthwise direction of compression and tension of each of the damper shafts 333 is, as described above, oriented in the z-axis direction. Specifically, the shearing stress acting on each of the damper shafts 333 is oriented to a direction parallel to a plane including the x and y axes. This causes the vibrational movement of the damper shafts 333 in the x- or y-axis direction during normal usage to be greater than that in the z-axis. Therefore, the size of the casing 410 and the location of the vibration isolators 330 within the casing 410 are so determined that the intervals L3 and L4, as shown in FIGS. 34(a) and 34(b), are great enough to avoid collision of the x- and y-axis protrusions of each of the holders 332 with the inner wall 411 of the casing 410 even when the holders 332 undergo a maximum deformation caused by the movement of the angular rate sensor 300 during normal usage in which the angular rate sensor 300 is free from accidental impact.

If the accidental impact acts on the angular rate sensor 300 through the casing 410 in the shearing direction of the damper shafts 333 of the vibration isolators 330, resulting in displacement of the angular rate sensor 300 over the interval L3 or L4, then the x- or y-axis protrusion of the holders 332 of the vibration isolators 330 collides with the inner wall 411 of the casing 410 to absorb the impact.

The size of each of the x- and y-axis protrusions of the holders 332 is so determined that an area facing the inner wall 411 of the casing 410 is greater than a cross sectional area of the damper shafts 333. This is because it is difficult to allow great vibration-damping strokes of the holders 332 in the x- and y-axis directions for the limitation of overall size of the sensor unit.

Figure 37:
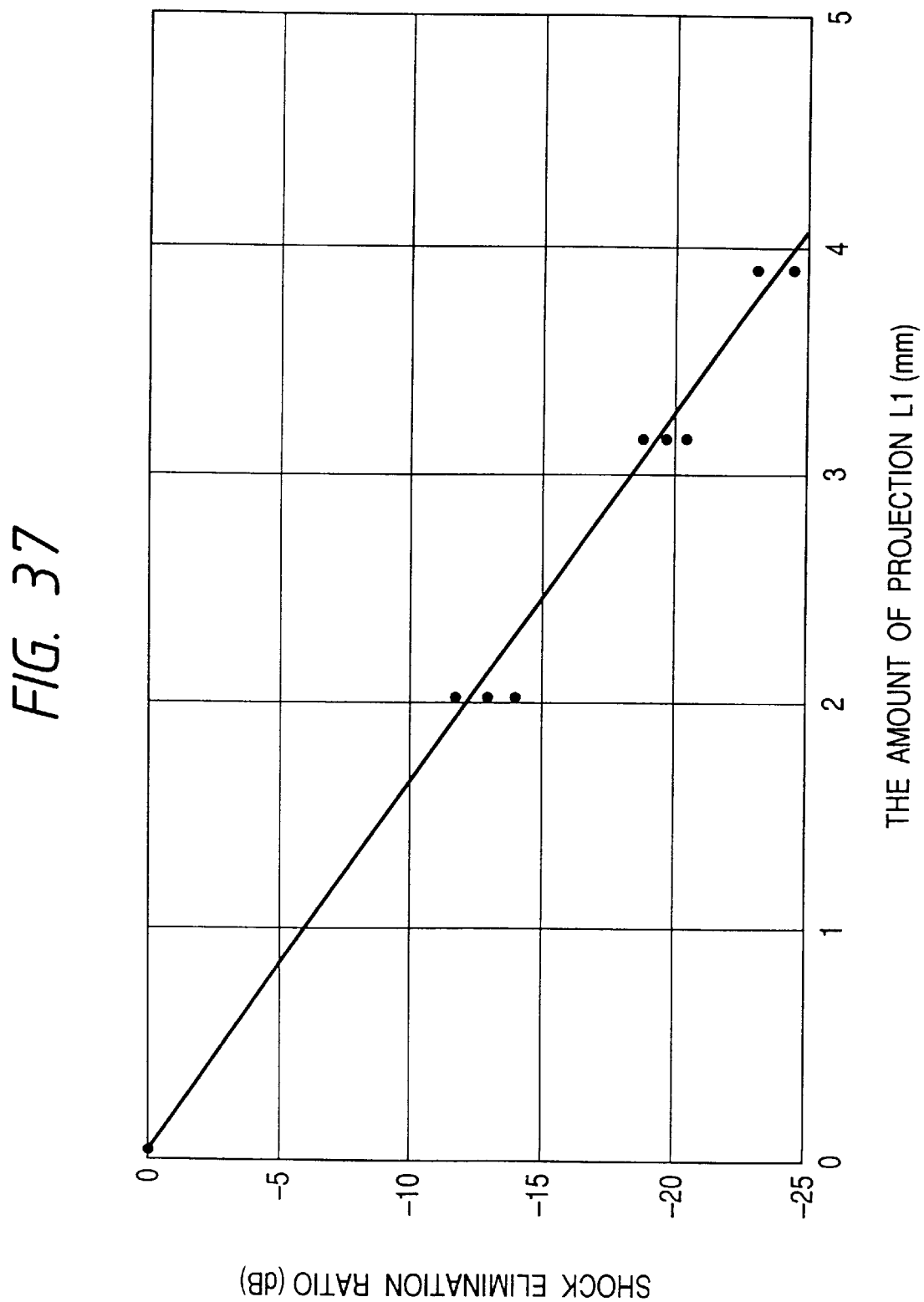
FIG. 37 shows the results of drop and impact tests when the thickness L1 of the holder 333 of the vibration isolator 330 is changed.

FIG. 37 shows the results of drop and impact tests. The ordinate axis indicates the shock elimination ratio of the holder 333, and the abscissa axis the thickness L1 of the side wall 451c of the holder 333 (i.e., the y-axis protrusion). The shock elimination ratio is a ratio of the amount of impact absorption when the y-axis protrusion has the thickness L1, as expressed by 20 log(impact acceleration acting on the oscillator 4/impact acceleration acting on the casing 410)dB to that when the y-axis protrusion has a thickness of zero, as defined as 0 db.

The graph shows that the impact absorption of the y-axis protrusion of the holder 333 is enhanced according to an increase in thickness L1. In this embodiment, the thickness L1 is 3.2 mm in view of the size of the angular rate sensor 300, an allowable drop height of the vibration-proofing structure, and a maximum deformation of the vibration-proofing structure.

In this embodiment, the holders 333 are made of a one-piece rubber cushion, but they may alternatively be made from rigid material except the x- and y-axis protrusions.

Figure 38:
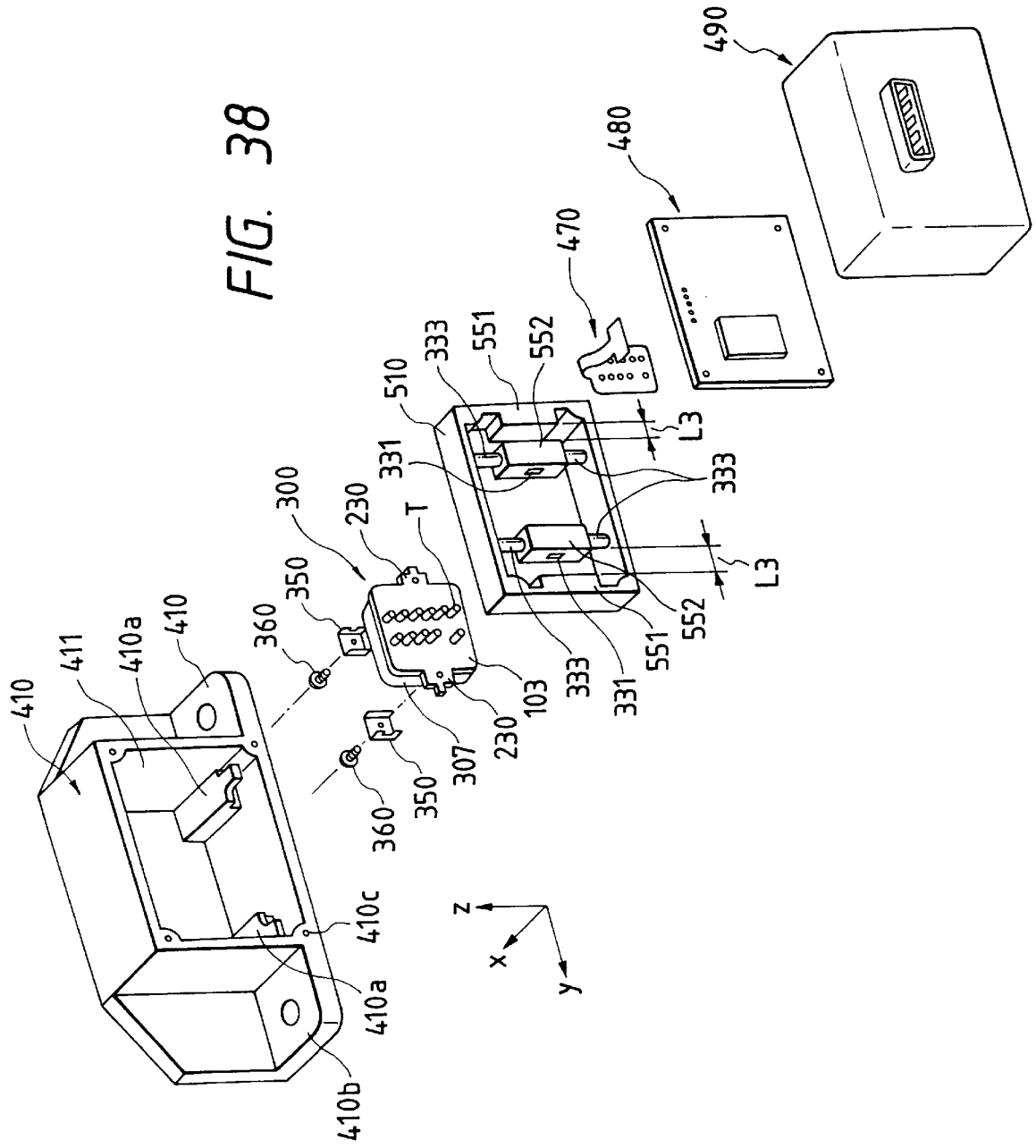
FIG. 38 is an exploded perspective view which shows a vibration proofing structure according to the fifteenth embodiment of the invention.

FIG. 38 shows the angular rate sensor unit 520 according to the fifteenth embodiment of the invention. The same reference numbers as employed in the fourteenth embodiment shown in FIG. 32 refer to the same parts, and explanation thereof in detail will be omitted here.

The vibration isolators 330 include the holder 552 and the damper shafts 333 and are formed integrally with the mount frame 510. The mount frame 510 is made from silicone rubber and fitted into the casing 410 in elastically tight engagement with the inner wall 411 or bonded to the inner wall 411 using the adhesive. The holder 552 does not have the x- and y-axis protrusions of the holder 332 of the fourteenth embodiment, but elastic protrusions 551 are instead formed on inner side walls of the mount frame 510. Each of the elastic protrusions 551 lies at the interval L3 away from the holder 552 of the vibration isolator 330 and works as the y-axis protrusion of the holder 332 of the fourteenth embodiment.

The mount frame 510 may alternatively be made from rigid material except the vibration isolators 330 and elastic protrusions 551.

Figure 39:
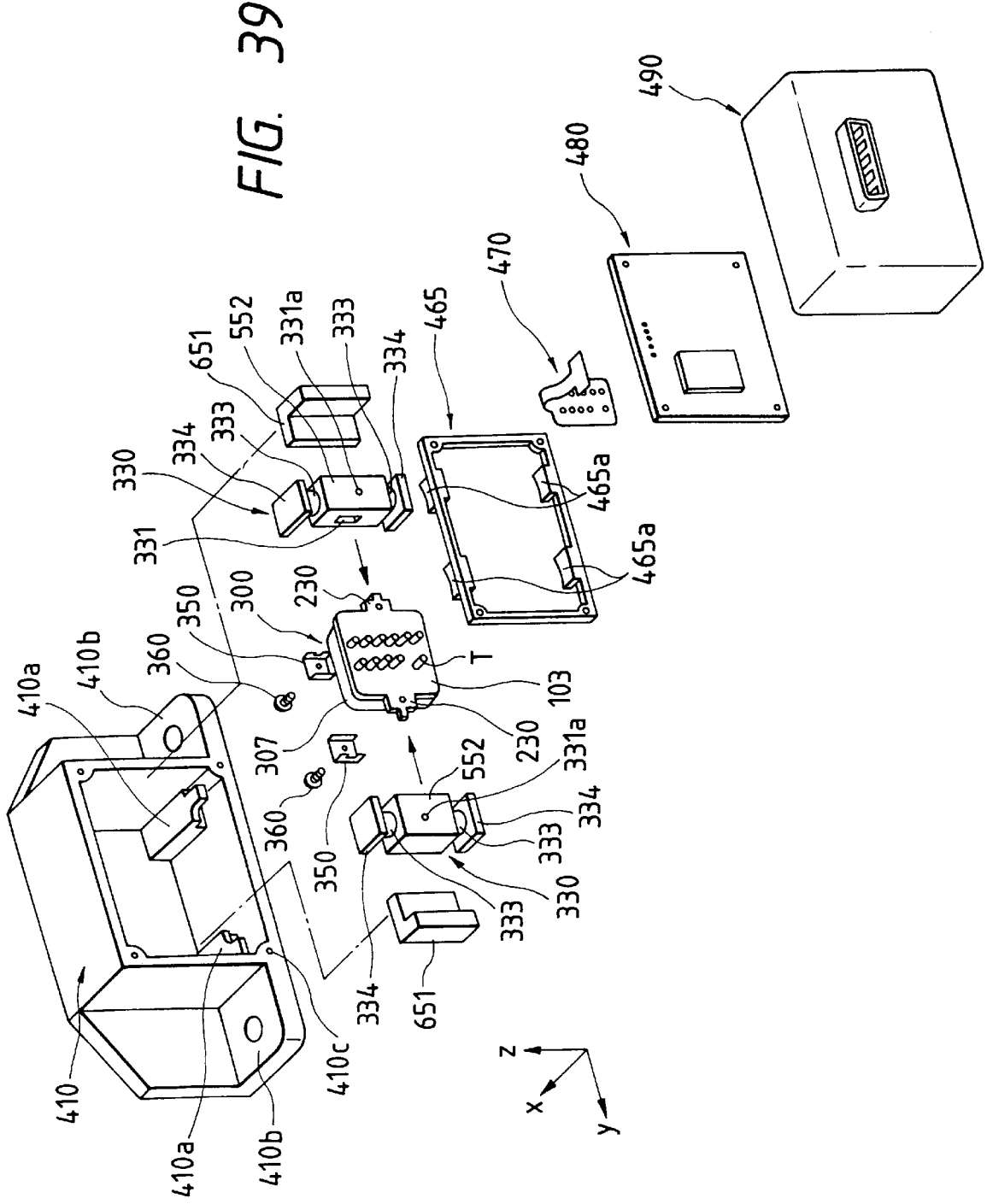
FIG. 39 is an exploded perspective view which shows a vibration proofing structure according to the sixteenth embodiment of the invention.

FIG. 39 shows the angular rate sensor unit 620 according to the sixteenth embodiment of the invention. The same reference numbers as employed in the above embodiments refer to the same parts, and explanation thereof in detail will be omitted here.

Each of the vibration isolators 330 includes the holder 552, the damper shafts 333, and mount bases 334. The holder 552 has the same structure as that of the holder 332 of the fourteenth embodiment except that it does not have the x- and y-axis protrusions. As an alternative to the x- and y-axis protrusions, L-shaped damper spacers 651 are bonded to the inner wall 411 of the casing 410 at the intervals L3 and L4 away from the vibration isolators 330. The intervals L3 and L4 are the same as those in the fourteenth embodiment.

The damper spacers 651 may be made from material different from that of the vibration isolators 330. For example, an elastic material showing a damping factor of approximately 0.4 which is greater than that of the vibration isolators 330 may be used.

The damper spacers 651 are bonded directly to the inner wall 411 of the casing 410, but may alternatively be installed with given clearances between themselves and the inner wall 411 using, for example, distance pieces.

Figure 40:
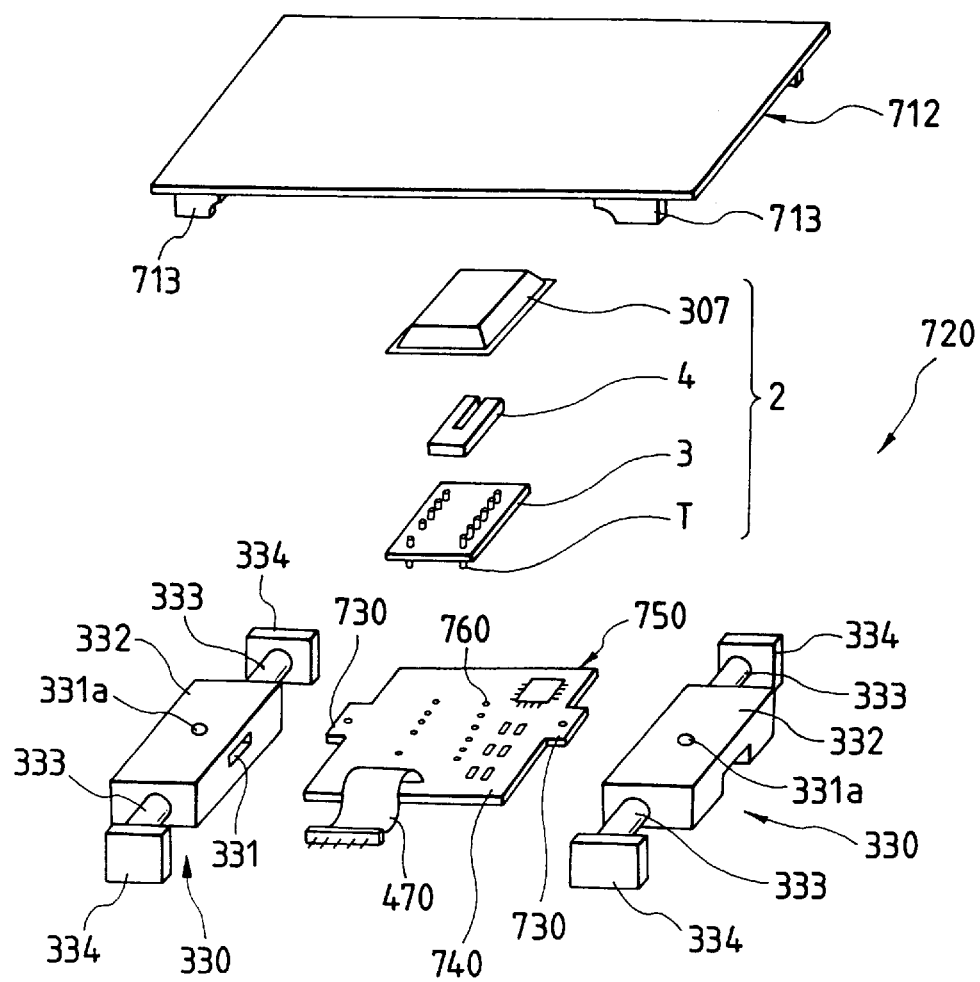
FIG. 40 is an exploded perspective view which shows a vibration proofing structure according to the seventeenth embodiment of the invention.

FIG. 40 shows the angular rate sensor unit 720 according to the seventeenth embodiment of the invention.

The angular rate sensor unit 720 generally includes the cover 712, the angular rate sensor 2, the control unit 750, the vibration isolators 330, and the casing 410. In FIG. 40, the same reference numbers as employed in the above embodiments refer to the same parts, and explanation thereof in detail will be omitted here.

The control unit 750 includes the circuit board 740 on which an excitation signal generator and an angular rate detector are mounted. The excitation signal generator outputting excitation signals to the oscillator 4 of the angular rate sensor 2. The angular rate detector receives an output of the angular rate sensor 2 to determine the angular rate of the moving object. The circuit board 740 has formed therein the terminal holes 760 into which the terminal T installed in the base 3 of the angular rate sensor 2 are inserted. The circuit board 740 is electrically connected to the connector 870 of the casing 410 through the flexible connector 470.

The cover 712 has formed on four corners of an inner wall thereof protrusions 713 in which U-shaped grooves are formed. The U-shaped grooves receive therein the mount bases 334 of the vibration isolators 330 to hold them in the seats 410a of the casing 410.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, the oscillator 4, as used in each of the above embodiments, is made of a single piezoelectric element, but may alternatively consist of a metallic tuning fork and a piezoelectric element attached to a surface of the tuning fork. Additionally, each of the arms 12 and 14 of the oscillator 4 is made of a square pole, but may alternatively be made of a strip member. In this case, the strip members are, as disclosed in Japanese Patent First Publication No. 5-322577, so oriented that the strip members extend parallel to each other and that a surface of one of the strip members faces a surface of the other at right angles. Further, the oscillator 4 may also be made of a single excitation member of square shape. In this case, a node of the excitation member is connected to the fixture.

Further, in the above embodiments, each of the arms 12 and 14 of the oscillator 4 is attached at the end thereof to the end surface (e.g., the attachment surface 6a) of the fixture, but may alternatively be connected or bonded to the fixture at either of side surfaces of a connecting portion of the arms 12 and 14.

The damper shafts 333 of the vibration isolators 330 are made of cylindrical elastic members, but may alternatively be made of elastic polygonal members such as triangular or rectangular poles.

What is claimed is:

1. An angular rate sensor apparatus for determining an angular rate of a moving object comprising:

a mounting member for mounting the angular rate sensor on the moving object;

a sensor unit including a base and an oscillator, the oscillator being mounted on said base and excited to oscillate so as to output a signal indicating an angular rate when subjected to rotation about a given axis; and a vibration isolator system isolating said sensor unit from vibration transmitted from said mounting member, said vibration isolator system connecting said mounting member and said sensor unit so that an elastic center associated with said vibration isolator system coincides with the center of gravity of said sensor unit, whereby vibration-induced elastic moments about the center of gravity of the sensor unit are essentially avoided.

2. An angular rate sensor apparatus as set forth in claim 1, wherein said oscillator has a node and an oscillating portion having a length which extends parallel to the given axis of rotation, and wherein said base has a reference surface on which the node of said oscillator is attached, the reference surface being arranged parallel to the length of the oscillating portion.

3. An angular rate sensor apparatus as set forth in claim 1, wherein said vibration isolator system includes an elastic member whose elastic force acts flush with the base of said sensor unit.

4. An angular rate sensor apparatus as set forth in claim 1, wherein said vibration isolator system includes a cylindrical elastic member having a length which extends parallel to said base.

5. An angular rate sensor apparatus as set forth in claim 2, wherein said vibration isolator system includes an elastic member having a length which extends parallel to the length of the oscillating portion of said oscillator.

6. An angular rate sensor apparatus as set forth in claim 1, wherein said vibration isolator system includes an elastic portion and a holder portion secured on said mounting member to hold said sensor unit in a given direction relative to said mounting member.

7. An angular rate sensor apparatus as set forth in claim 6, wherein the base of said sensor unit includes a protrusion supported by the holder portion of said vibration isolator system.

8. An angular rate sensor apparatus as set forth in claim 7, wherein the protrusion is connected to the holder portion using a screw.

9. An angular rate sensor apparatus as set forth in claim 7, wherein the holder portion of said vibration isolator system includes a hole into which the protrusion of the base of said sensor unit is fitted.

10. An angular rate sensor apparatus as set forth in claim 1, wherein said mounting member is a box within which said sensor unit and said vibration isolator system is disposed, the box having formed on an inner wall a bearing base having a groove into which said vibration isolator system is fitted elastically.

11. An angular rate sensor apparatus as set forth in claim 1, wherein the oscillator of said sensor unit is a tuning fork oscillator including a pair of arms extending parallel to the given axis of rotation.

12. An angular rate sensor apparatus as set forth in claim 1, wherein said mounting member is a casing within which said sensor unit and said vibration isolator system are disposed, and further comprising a damper member disposed between an inner wall of the casing and said sensor unit.

13. An angular rate sensor apparatus as set forth in claim 12, wherein said damper member is formed on the inner wall of the casing at a given interval away from said sensor unit.

14. An angular rate sensor apparatus as set forth in claim 12, wherein said damper member is formed on said vibration isolator system at a given interval away from the inner wall of the casing.

15. An angular rate sensor apparatus as set forth in claim 12, wherein said vibration isolator system includes an elastic portion and a holder portion secured on said mounting member to hold said sensor unit in a given direction relative to said mounting member, and wherein said damper member is formed on the holder portion.

16. An angular rate sensor apparatus as set forth in claim 15, wherein the base of said sensor unit includes a protrusion supported by the holder portion of said vibration isolator system.

17. An angular rate sensor apparatus as set forth in claim 12, wherein the oscillator of said sensor unit is a tuning fork oscillator including a pair of arms extending parallel to the given axis of rotation.

18. An angular rate sensor apparatus as set forth in claim 12, wherein said damper member damps an impact acting in a shearing direction of said vibration isolator system.

19. An angular rate sensor apparatus as set forth in claim 12, wherein said damper member absorbs impacts acting in first and second direction perpendicular to each other both of which are oriented perpendicular to a shearing direction of said vibration isolator system.

20. An angular rate sensor apparatus as set forth in claim 19, wherein said damper member includes an L-shaped elastic member disposed at an inner corner of the casing.

21. An angular rate sensor apparatus as set forth in claim 19, wherein said vibration isolator system absorbs an impact acting in a third direction perpendicular to the first and second directions.

22. An angular rate sensor apparatus as set forth in claim 21, wherein a direction of oscillation of said oscillator when excited coincides with the first direction.

23. An angular rate sensor as set forth in claim 21, wherein said vibration isolator system includes an elastic member having a length extending in the third direction.

24. An angular rate sensor as set forth in claim 12, further comprising a signal processing circuit providing an excitation signal to excite said oscillator and receiving the signal outputted from said oscillator to determine the angular rate, said signal processing circuit being connected to said vibration isolator system.

25. An angular rate sensor apparatus as set forth in claim 12, further comprising a rectangular mount frame including first and second opposed walls and third and fourth opposed walls, attached to an inner wall of the casing, and wherein said vibration isolator system is supported by the first and second opposed walls so as to absorb an impact acting in a first direction parallel to the third and fourth opposed walls, said damper member being mounted on at least one of the third and fourth opposed walls to absorb an impact acting in a second direction perpendicular to the first direction.

* * * * *

UNITED STATES PATENT AND TRADEMARK OFFICE
CERTIFICATE OF CORRECTION

PATENT NO. : 6,182,508 B1
DATED : February 6, 2001
INVENTOR(S) : Hayashi et al.

It is certified that error appears in the above-identified patent and that said Letters Patent is hereby corrected as shown below:

Please correct the inventorship to read as follows:
-- (75) Inventors: Satoshi Hayashi, and Tomoyuki Kanda, both of Kuwana, (JP) --

Signed and Sealed this

Eighteenth Day of September, 2001

Attest:

*Nicholas P. Godici*

NICHOLAS P. GODICI
*Attesting Officer*        *Acting Director of the United States Patent and Trademark Office*